(12) United States Patent
Karol

(10) Patent No.: US 11,104,269 B2
(45) Date of Patent: Aug. 31, 2021

(54) DYNAMIC VEHICLE WARNING SIGNAL EMISSION

(71) Applicant: Zoox, Inc., Foster City, CA (US)

(72) Inventor: Kevin Mark Karol, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 0 days.

(21) Appl. No.: 16/656,312

(22) Filed: Oct. 17, 2019

(65) Prior Publication Data
US 2021/0114514 A1    Apr. 22, 2021

(51) Int. Cl.
*B60Q 1/52* (2006.01)
*B60Q 5/00* (2006.01)
*G06N 5/04* (2006.01)
*G06N 20/00* (2019.01)
*G08G 1/16* (2006.01)

(52) U.S. Cl.
CPC ............ *B60Q 1/525* (2013.01); *B60Q 5/006* (2013.01); *G06N 5/04* (2013.01); *G06N 20/00* (2019.01); *G08G 1/166* (2013.01)

(58) Field of Classification Search
CPC ........ B60Q 1/525; B60Q 5/006; G06N 20/00; G06N 5/04; G08G 1/166
USPC ........................................................ 340/474
See application file for complete search history.

(56) References Cited

U.S. PATENT DOCUMENTS

| 9,786,178 | B1 * | 10/2017 | Bai | ................. | B60Q 5/006 |
| 2004/0150514 | A1 * | 8/2004 | Newman | ............... | G08G 1/166 340/435 |
| 2009/0099736 | A1 | 4/2009 | Hawes et al. | | |
| 2014/0218186 | A1 * | 8/2014 | Kawamoto | ............. | B60R 25/10 340/426.1 |
| 2015/0228066 | A1 * | 8/2015 | Farb | ................. | H04N 5/232941 348/148 |
| 2018/0009378 | A1 | 1/2018 | Myers et al. | | |
| 2018/0068577 | A1 * | 3/2018 | Javanbakht | ............. | G06F 3/015 |
| 2018/0261081 | A1 * | 9/2018 | Suzuki | .................. | G08G 1/005 |
| 2019/0308620 | A1 | 10/2019 | Sapp et al. | | |

(Continued)

FOREIGN PATENT DOCUMENTS

KR    20170011487 A    2/2017
WO    WO2016179802 A1    11/2016

OTHER PUBLICATIONS

PCT Search Report and Written Opinion dated Jan. 14, 2021 for PCT application No. PCT/US20/54545, 10 pages.

*Primary Examiner* — Omar Casillashernandez
(74) *Attorney, Agent, or Firm* — Lee & Hayes, P.C.

(57) ABSTRACT

A vehicle computing system may implement techniques to dynamically modify warning signals from a vehicle to ensure that an object (e.g., dynamic object) is notified of the vehicle operation. A vehicle computing system may emit a first warning signal including an audio and/or visual signal and may detect an object reaction to the first warning signal. Based on a determination that the object reaction does not substantially alter the ability for the vehicle to overcome the object, the vehicle computing system may modify a frequency, volume, luminosity, color, shape, motion, etc. of the first warning signal to emit a second warning signal. The vehicle computing system may continually modify warning signals until the object reacts according to an expected reaction or becomes irrelevant to the vehicle.

20 Claims, 7 Drawing Sheets

(56) References Cited

U.S. PATENT DOCUMENTS

2019/0329794 A1* 10/2019 Kim .................. B60K 35/00
2020/0272148 A1* 8/2020 Karasev ............ G06K 9/00805

* cited by examiner

DYNAMIC VEHICLE WARNING SIGNAL EMISSION

BACKGROUND

Vehicles in operation today are often equipped with horns that enable an operator of a vehicle to call attention to the vehicle, such as to warn others of a potential hazard in an environment. Conventional vehicle horns are configured to emit a sound at a particular frequency and volume. However, the particular frequency and/or volume of the vehicle horn may often be insufficient to get the attention of a pedestrian, such as one listening to music via headphones or one who is hard of hearing. As such, the vehicle horn may be ineffective in warning others of a potential hazard.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
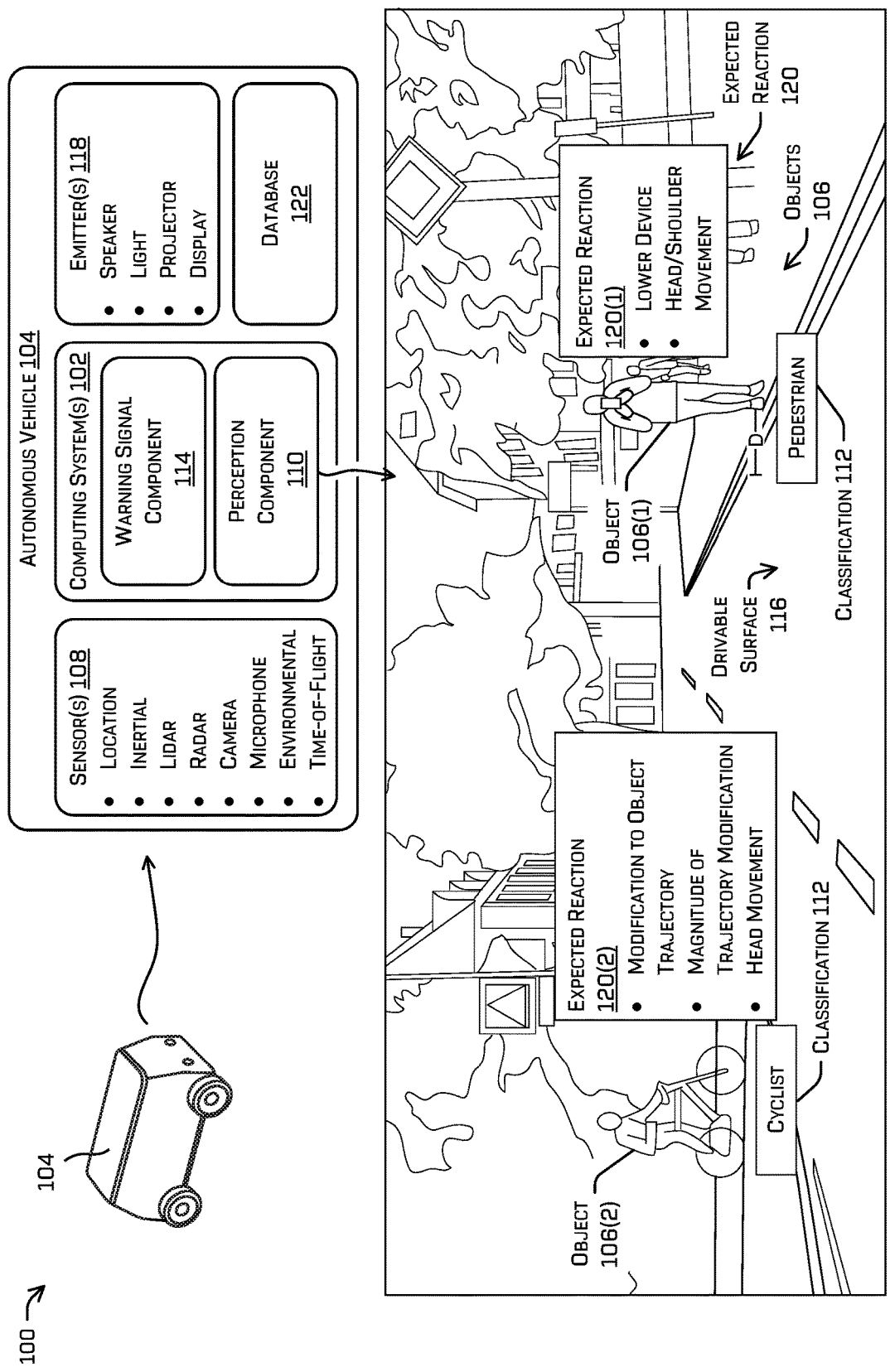
FIG. 1 is an illustration of an environment, in which a dynamic warning signal system may be used by an autonomous vehicle to warn an object of a potential conflict between the vehicle and an object in the environment, in accordance with examples of the disclosure.

This disclosure is directed to techniques for improving vehicle warning systems. The vehicle warning systems may be configured to emit a sound and/or a light to warn objects (e.g., dynamic object) in an environment proximate the vehicle of a potential conflict with the vehicle. The vehicle may include an autonomous or semi-autonomous vehicle. The objects may include pedestrians, bicyclists, animals (e.g., dogs, cats, birds, etc.), other vehicles (e.g., cars, trucks, motorcycles, mopeds, etc.), or any other object that may potentially cause a conflict (e.g., collision) with the vehicle. A vehicle computing system may be configured to identify an object in the environment and determine that a potential conflict between the vehicle and the object may occur. The vehicle computing system may emit a first signal to warn the object of the potential conflict and, based on a determination that an object reaction did not substantially match an expected reaction, emit a second (different) signal. The vehicle computing system may continue to modify warning signals until the object reacts according to the expected reaction or the object is no longer relevant to the vehicle (e.g., potential of collision no longer exists), thereby maximizing safe operation of the vehicle.

The vehicle computing system may be configured to identify objects in the environment. In some examples, the objects may be identified based on sensor data from sensors (e.g., cameras, motion detectors, lidar, radar, etc.) of the vehicle. In some examples, the objects may be identified based on sensor data received from remote sensors, such as, for example, sensors associated with another vehicle or sensors mounted in an environment that are configured to share data with a plurality of vehicles. In various examples, the vehicle computing system may be configured to determine classifications associated with the objects, such as whether the objects are pedestrians, bicyclists, animals, other vehicles, or the like.

The vehicle computing system may be configured to emit a first warning signal to alert one or more objects in the environment of the vehicle presence and/or operation. The first warning signal may include an audio signal and/or a light signal. The first warning signal may include a first set of characteristics, such as frequency, volume, luminosity, color, shape, motion, or the like. In various examples, the first warning signal may be emitted based on a detection of an object in the environment and/or features associated with the detection. In such examples, the features associated with the detection may include a distance between the vehicle and the object, a relative speed between the vehicle and the object, and the like. For example, the vehicle computing system may detect a bicyclist on the road and may determine that the bicyclist may not hear the vehicle approaching from behind. The vehicle computing system may emit a warning signal toward the bicyclist, such as to warn the bicyclist of the vehicle's approach so that the bicyclist does not swerve or otherwise maneuver into the road.

In some examples, the first warning signal may be emitted based on a classification, subclassification (e.g., age, height, etc.), and/or additional features associated with the detected object. In such examples, the vehicle computing system may determine the classification, subclassification, and/or additional features associated with the detected object and may determine the first set of characteristics associated with the first warning signal based on the classification, subclassification, and/or additional features. For example, a first warning signal generated to warn a pedestrian of the vehicle operation may include a lower volume than a first warning signal generated to warn the bicyclist described in the example above. For another example, a first warning signal generated to get the attention of an operator of a car may include a higher volume than a first warning signal generated to get the attention of an operator of a motorcycle. For yet another example, a first warning signal generated for a pedestrian wearing headphones may include a first frequency and a first warning signal generated for a pedestrian that is looking at (e.g., a direction associated with) the vehicle may include a second frequency.

In various examples, the first warning signal may be emitted based on a location associated with the vehicle, such as a location associated with pedestrians, bicyclists, or other objects (e.g., school zone, proximity to a playground, construction zone, etc.). In some examples, the first warning signal may be emitted based on a speed associated with the vehicle (e.g., less than 15 miles per hour, less than 30 kilometers per hour, etc.). In some examples, the first warning signal may include an electric vehicle warning sound, such as that required by law and/or regulation.

In some examples, the vehicle computing system may cause the first warning signal to be emitted based on a determination that a detected object is relevant to the vehicle (e.g., a potential conflict between the vehicle and object may exist, object may potentially slow forward progress of the vehicle). In various examples, the vehicle computing system may be configured to determine relevance of an object utilizing the techniques described in U.S. patent application Ser. No. 16/193,945, filed Nov. 16, 2018 and entitled "Dynamic Sound Emission for Vehicles," the entire contents of which are incorporated herein by reference. In some examples, the determination of object relevance may be based on a location associated with the object being within a threshold distance of a path of the vehicle. In such examples, the path may correspond to a drivable surface over which the vehicle plans to travel from a first location to a destination. In some examples, the determination of object relevance may be based on a potential trajectory of the object intersecting a trajectory associated with the vehicle (e.g., trajectory associated with the vehicle path). In such examples, the vehicle computing system may determine the potential object trajectory based on the sensor data.

In various examples, the trajectory and/or intent of an object may be determined utilizing techniques described in U.S. Pat. No. 10,414,395, issued Sep. 17, 2019 and entitled "Feature-Based Prediction," the entire contents of which are incorporated herein by reference. For example, the vehicle computing system may detect a pedestrian jaywalking in the road ahead of the vehicle. The vehicle computing system may determine that the pedestrian trajectory may conflict with the vehicle trajectory, such that, absent a modification to one or both trajectories, a collision between the vehicle and the pedestrian could occur. The vehicle computing system may cause the first warning signal to be emitted to warn the pedestrian of the vehicle operation on the road. In some examples, the vehicle computing system may cause the first warning signal to be emitted concurrently with or immediately prior to modifying the vehicle trajectory (e.g., yielding to the pedestrian), such as to maximize safe operation of the vehicle.

In various examples, the vehicle computing system may determine an object reaction to the first warning signal, based on sensor data. In some examples, the reaction may include a change in the object trajectory (e.g., speed increase, speed decrease, direction of travel away from the vehicle, etc.), a movement of the head and/or shoulders of the object, a gesture (e.g., a wave, etc.), a foot placement of the object, a positional adjustment to an item the object holds (e.g., adjusting a position of an electronic device, book, magazine, or other item), and/or any other movement indicative of an object reacting the first warning signal.

In various examples, the vehicle computing system may compare the object reaction to an expected reaction (also referred to generally as an object action) associated with the first warning signal (also referred to generally as a first signal). In various examples, the vehicle computing system may be configured to determine the expected reaction based on one or more characteristics of the first warning signal (e.g., volume, frequency, luminosity, color, motion (e.g., animated motion, light sequencing, etc.), shape of the signal, etc.) and/or data associated with the object (e.g., object attribute (e.g., classification, position (e.g., facing/moving toward the vehicle, facing/moving away from the vehicle, etc.), distance from the vehicle, trajectory, etc.), object activity (e.g., walking, running, riding a scooter, (e.g., a particular activity implied by an object trajectory, such as based on speed, etc.), reading a book, talking on a phone, viewing data on an electronic device, interacting with another vehicle, interacting with another object (e.g., talking to another person, looking into a stroller, etc.), eating, drinking, operating a sensory impairment device (e.g., cane, hearing aid, etc.), listening to headphones, etc.). In some examples, the vehicle computing system may access a database of expected reactions to determine the expected reaction associated with the first warning signal. In such examples, the expected reactions in the database may be stored based at least in part on the data associated with the object and/or characteristic(s) of the first warning signal. In various examples, the vehicle computing system may determine an expected reaction utilizing machine learning techniques. In such examples, a model may be trained utilizing training data including a plurality of warning signals and detected reactions thereto.

Based on the comparison between the object reaction and the expected reaction, the vehicle computing system may determine whether the object reacted as expected (e.g., whether a substantial match exists between the object reaction and the expected reaction). Responsive to a determination that the object reaction substantially matches the expected reaction, the vehicle computing system may store the encounter (e.g., data associated with first warning signal and the object reaction) in the database. In some examples, the database may be used for future object reaction comparisons, such as to increase a confidence in a reaction to the first warning signal, to train the machine learned model, or the like.

In various examples, the determination of a substantial match between the object reaction and the expected reaction may include a match of a threshold number of actions (e.g., one matching actions, two matching actions, etc.), a threshold percentage of actions (e.g., 90%, 50%, etc.), or the like. In some examples, the substantial match may be determined based on a threshold match and/or threshold difference between the object reaction and the expected reaction. The actions may include trajectory modifications (e.g., increase in speed, decrease in speed, change in direction of travel, etc.), body movements (e.g., foot placement, head rotation, shoulder movement, etc.), gestures, or the like. For example, an expected reaction to the first warning signal may include a head and/or shoulder movement and a positional adjustment to an electronic device the object holds. The object reaction may include a head movement toward the vehicle. Based on a match of at least the head movement, the vehicle computing system may determine that the object reaction and the expected reaction substantially match. For another example, the vehicle computing system may determine that an object reaction matches an expected reaction at 75%, with a threshold match at 65%. Based on a determination that the percentage of the match meets or exceeds the threshold match, the vehicle computing system may determine that the object reaction substantially matches the expected reaction.

In some examples, the determination of a substantial match between the object reaction and the expected reaction may include determining that a modification to an object trajectory meets or exceeds a threshold modification. In some examples, the threshold modification may include a modification that renders the object irrelevant to the vehicle (e.g., does not impede progress of the vehicle, no potential for conflict, etc.). In such examples, based at least in part on determining the modification, the vehicle computing system may cause the vehicle to proceed along a vehicle trajectory (e.g., at a planned speed, direction, etc.). In some examples, the threshold modification may include a change in speed and/or direction associated with the object trajectory (e.g., 45 degrees, 90 degrees, etc.).

Responsive to a determination that the object reaction did not substantially match (e.g., less than the threshold number of actions, percentage match, etc.), the vehicle computing system may determine that the object did not react according to an expected reaction. In such examples, the vehicle computing system may determine that the object remains unaware of the vehicle operation and/or presence of the vehicle in the environment. Based on a determination that the object did not react according to the expected reaction, the vehicle computing system may emit a second warning signal. In some examples, the second warning signal may include a signal of a different modalit(ies) (e.g., light, sound, etc.) than the first warning signal. For example, the first warning signal may include a sound emission and the second warning signal may include a light emission.

In some examples, the second warning signal may include a signal of a same modalit(ies) as the first warning signal. In such examples, the vehicle computing system may modify a frequency, volume, luminosity, color, shape, motion, and/or other characteristic of the first warning signal to generate the second warning signal. For example, based on a determination that a detected object did not react according to an expected reaction to a first warning signal including a first frequency emitted at 50 decibels, the vehicle computing system may cause a second warning signal including a second frequency to be emitted at 70 decibels. For another example, based on a determination that a detected object did not react to a first warning signal including a red and green light emission, the vehicle computing system may cause a second warning signal including a yellow and blue light to be emitted. However, it is understood that the specific volumes and colors in the aforementioned examples are merely for illustrative purposes, and other signal characteristics (e.g., volume, frequency, luminosity, color, shape, motion, etc.) are contemplated herein.

In various examples, the vehicle computing system may compare a second object reaction to a second expected reaction associated with the second warning signal. Responsive to a determination that the second object reaction substantially matches the second expected reaction, the vehicle computing system may store data associated with the object reaction and/or the second warning signal in the database of object reactions. As discussed above, in some examples, the database may be used for future object reaction comparisons, such as to increase a confidence in a reaction to a warning signal, to train the machine learned model, or the like.

Responsive to a determination that the second object reaction does not substantially match the second expected reaction, the vehicle computing system may cause a third warning signal to be emitted, the third warning signal being different from the first warning signal and the second warning signal (e.g., different modality, different characteristics, etc.). Continuing the example from above, based on a determination that a second object reaction to the second frequency emitted at 70 decibels does not substantially match a second expected reaction, the vehicle computing system may cause a third frequency to be emitted at 90 decibels.

In various examples, the vehicle computing system may continue to modify (e.g., iteratively modify) emitted warning signals until an object reaction substantially matches an expected reaction to the warning signal. In various examples, the vehicle computing system may continue to modify emitted warning signals based on a determination that the object is relevant to the vehicle. In such examples, a modified warning signal may be emitted based on a determination that the detected object is relevant to the vehicle. In some examples, the vehicle computing system may be configured to continually and/or periodically (e.g., every 0.1 seconds, 1.0 seconds, prior to generating a modified warning signal, etc.) determine whether the detected object is relevant to the vehicle. For example, a vehicle computing system may determine that a detected object did not react to the second warning signal according to the second expected reaction. However, prior to emitting a third warning signal, the vehicle computing system may determine that the detected object is behind the vehicle and traveling in a different direction from the vehicle. As such, the vehicle computing system may determine that the detected object is no longer relevant to the vehicle and may determine to not emit the third warning signal.

In various examples, based on a determination that the detected object reacted in accordance with an expected reaction and/or that the detected object is irrelevant to the vehicle, the vehicle computing system may cease emitting a warning signal. In some examples, based on the determination that the detected object reacted in accordance with the expected reaction and/or the detected object is irrelevant to the vehicle, the vehicle computing system may cause the first warning signal to be emitted. In such examples, the first warning signal may include a baseline warning signal emitted to alert nearby objects of the vehicle presence and/or operation. For example, and as discussed above, the baseline warning signal may include an electric vehicle warning sound, such as that required by law and/or regulation. For another example, the baseline warning signal may include a sound and/or light emitted based on a location associated with the vehicle.

In addition to providing a warning signal to alert an object of the presence and/or operation of the vehicle, the vehicle computing system may be configured to generate a routing signal for the object in the environment. In various examples, the routing signal may include a proposed route for the object to take to avoid a conflict (e.g., collision, blockage, etc.) with the vehicle. In various examples, the vehicle computing system may generate the routing signal based on a determination that the object is a blocking object. In such examples, the vehicle computing system may determine that the object is blocking a path of the vehicle. The object may be blocking the path of the vehicle based on a determination that the object is stopped at a location that at least partially blocks forward progress of the vehicle toward a destination. In some examples, the vehicle computing system may determine that the object is the vehicle based on a determination the vehicle may be unable to proceed toward the destination while staying within the confines of a drivable corridor (e.g., drivable surface over which the vehicle plans to travel along the path). For example, the object may be stopped in an intersection in the path of the vehicle, such that the vehicle is unable to proceed through the intersection.

In various examples, based on a determination that the object is a blocking object, the vehicle computing system may be configured to identify potential routing options for the blocking object. A potential routing option may include a clear (e.g., unoccupied) path the blocking object may follow to move out of the path of the vehicle. In some examples, the potential routing option may include an area into which the blocking object may move. In some examples, the area may include that which an operator of the blocking object is unable to view, such as due to another object being located between the blocking object and the area. Using the example from above, the blocking object may be turning left in an intersection in front of the vehicle and may be stopped in a first lane in an intersection behind a delivery vehicle. The blocking object may be unable to see that an area beyond the intersection in a second lane is unoccupied and therefore the blocking object may be unaware of the area into which the blocking object may move to clear the intersection. The vehicle computing system may be configured to identify the area into which the blocking object may move.

In various examples, based on the identification of the area into which the blocking object may move (e.g., clear path the blocking object may follow to move out of the path of the vehicle), the vehicle computing system may cause a routing signal to be emitted. The routing signal may indicate to the operator of the blocking object that the area is clear. In some examples, the routing signal may include a light emitted in the direction of the area, an arrow, or other means by which the vehicle computing system may communicate the clear area into which the blocking object may move.

The techniques described herein may substantially improve the safe operation of autonomous and semi-autonomous vehicle operating in an environment. An increasing number of pedestrians, bicyclists, scooter riders, and the like operate on drivable surfaces, often while listening to music, podcasts, or the like via headphones. The sounds emitted via the headphones may drown out the sound of the vehicles operating nearby, thereby rendering the people unaware of the presence and/or operation of the vehicles, even those vehicles emitting an electric vehicle warning sound. To increase awareness and thus safety of the autonomous and/or semi-autonomous vehicles, the techniques described herein recognize that an object is not reacting to a first warning signal emitted by a vehicle and adjust one or more characteristics of the first warning signal in an attempt to alert the object of the vehicle operation and/or presence. The vehicle computing system may continue to modify (e.g., iteratively modify) the warning signals until the object reacts according to an expected reaction or is no longer relevant to the vehicle, thereby maximizing the safe operation of the vehicle in the environment.

The techniques described herein may be implemented in a number of ways. Example implementations are provided below with reference to the following figures. Although discussed in the context of an autonomous vehicle, the methods, apparatuses, and systems described herein may be applied to a variety of systems (e.g., a sensor system or a robotic platform), and are not limited to autonomous vehicles. In another example, the techniques may be utilized in an aviation or nautical context, or in any system using machine vision (e.g., in a system using image data). Additionally, the techniques described herein may be used with real data (e.g., captured using sensor(s)), simulated data (e.g., generated by a simulator), or any combination of the two.

FIG. 1 is an illustration of an environment 100, in which one or more computing systems 102 of an autonomous vehicle 104 (e.g., vehicle 104) may utilize a dynamic warning signal system to alert one or more objects 106 of a presence and/or operation of the vehicle 104 in the environment 100. The computing system(s) 102 may detect the object(s) 106 based on sensor data captured by one or more sensors 108 of the vehicle 104 and/or one or one or more remote sensors (e.g., sensors mounted on another vehicle 104 and/or mounted in the environment 100, such as for traffic monitoring, collision avoidance, or the like). The sensor(s) 108 may include data captured by lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, time-of-flight sensors, environment sensors (e.g., temperature sensors, humidity sensors, light sensors, pressure sensors, etc.), and the like.

In some examples, the sensor data can be provided to a perception component 110 configured to determine a classification 112 associated with the object(s) 106 (e.g., car, truck, pedestrian, bicycle, motorcycle, animal, etc.). In various examples, the perception component 110 may determine an object classification 112 based on one or more features associated with the object(s) 106. The features may include a size (e.g., width, height, depth, etc.), shape (e.g., geometry, symmetry, etc.), and/or other distinguishing features of the object(s) 106. For example, the perception component 110 may recognize a size and/or shape of an object 106, such as object 106(1), corresponds to a pedestrian and a size and/or shape of another object 106, such as object 106(2), corresponds to a cyclist.

In various examples, based in part on a detection of one or more objects 106 in the environment 100, a warning signal component 114 of the computing system(s) 102 may generate and/or cause a first warning signal to be emitted in order to alert the object(s) 106 of the vehicle 104 presence and/or operation. The first warning signal may include an audio signal and/or a visual signal. The first warning signal may include a first set of characteristics, such as frequency, volume, luminosity, color, shape, motion, or the like. In some examples, the first set of characteristics may include a pre-determined set of characteristics. In such examples, the first warning signal may include a baseline warning signal associated with alerting objects 106 of the presence and/or operation of the vehicle 104. For example, the first warning signal may include an electric vehicle warning sound including a pre-determined frequency and emitted at a pre-determined volume.

In various examples, the first set of characteristics may be determined dynamically, such as based on one or more real-time conditions associated with the environment 100. The real-time conditions may include data associated with the object 106 (e.g., object attribute (e.g., classification, position (e.g., facing/moving toward the vehicle, facing/moving away from the vehicle, etc.), distance from the vehicle, trajectory, etc.), object activity (e.g., walking, running, riding a scooter, (e.g., a particular activity implied by an object trajectory, such as based on speed, etc.), reading a book, talking on a phone, viewing data on an electronic device, interacting with another vehicle, interacting with another object (e.g., talking to another person, looking into a stroller, etc.), eating, drinking, operating a sensory impairment device (e.g., cane, hearing aid, etc.), listening to headphones, etc.), environmental factors (e.g., noise level in the environment 100, amount of traffic, road conditions, etc.), weather conditions (e.g., rain, snow, hail, wind, etc.), vehicular considerations (e.g., speed, passengers in the vehicle 104, etc.), and the like. For example, the first set of characteristics associated with a first warning signal generated for a pedestrian wearing headphones may include a first frequency and a first set of characteristics associated with a first warning signal generated for a pedestrian that is looking in a direction associated with the vehicle may include a second frequency.

In various examples, the frequency (e.g., one or more frequencies) of the first warning signal may include a frequency (or set/range of frequencies) that is perceptible to the object 106, such as based on the classification 112 of the object 106. For example, the warning signal component 114 may determine that an object 106 is a dog. Based in part on the classification 112 as a dog, the warning signal component 114 may determine to emit a first warning signal at a frequency detectable to dogs and not humans, such as to cause the dog to avoid the vehicle 104 and/or the vehicle path. In various examples, one or more characteristics of the first set of characteristics (e.g., volume and/or volume range, one or more frequencies, luminosities, shapes, motions, and/or color(s)) may be determined based on an urgency of the warning (e.g., low urgency (e.g., alert), medium urgency ((e.g., caution), high urgency (e.g., warning)), a likelihood of conflict between the vehicle 104 and the object 106, a message to be conveyed to the object 106 (e.g., the vehicle 104 is approaching, please stop, trajectories are rapidly converging, etc.).

In various examples, one or more characteristics of the first set of characteristics may be determined based on an object activity (e.g., a detected distraction associated with the object 106). The detected distraction may include the tactile use of a mobile phone, a determination that the potentially conflicting object is engaged in a conversation (e.g., with another object proximate to the object 106, on a mobile phone, or the like), a determination that the object 106 is wearing headphones, earmuffs, ear plugs, or any other device configured to fit in or around an auditory canal.

In some examples, the one or more characteristics of the first set of characteristics may be determined based on weather conditions in the environment. The weather conditions may include rain, wind, sleet, hail, snow, temperature, humidity, large pressure changes, or any other weather phenomenon which may affect an auditory perception of an object 106 in the environment 100. In various examples, the one or more characteristics of the warning signal may be determined based on road conditions in the environment. The road conditions may include a smoothness of road surface (e.g., concrete, asphalt, gravel, etc.), a number of potholes, uneven terrain (e.g., rumble strips, washboards, corrugation of road, etc.), or the like. For example, objects 106 and/or vehicles 104 operating on a gravel road may generate a larger amount of noise than when operating on a smooth surface. The increase in noise generated by the objects 106 and/or vehicles 104 (e.g., impact amount of noise from travel) may result in a subsequent increase in the determined volume and/or volume range of the warning signal.

In various examples, the one or more characteristics of the first set of characteristics may be determined based on a location of the object 106 in the environment 100. For example, if the object 106 is located in a roadway shared by the vehicle 104, a volume and/or volume range and/or luminosity may be higher than if the object 106 is located on the sidewalk, such as indicating an intent to enter the roadway. For another example, if the object 106 is a pedestrian standing on a median between opposite direction traffic, a volume and/or volume range and/or luminosity may be higher than if the object 106 is located in a bike lane, proximate a curb.

In some examples, the one or more characteristics of the first set of characteristics may be determined based on a detected loss of one or more sensors 108 on the vehicle 104. For example, the vehicle computing system may determine that a speaker on the vehicle is not functioning at an optimal capacity. Accordingly, the vehicle computing system may increase a volume of the warning signal to compensate for the decreased capacity of the speaker. For another example, the vehicle computing system may determine that a light on the vehicle 104 is not functioning. Accordingly, the vehicle computing system may increase a luminosity and/or frequency of flashing of a visual warning signal to compensate for the non-functioning light.

In various examples, the one or more characteristics of the first set of characteristics may be determined based on a detection of a passenger in the vehicle 104. In some examples, the detection of the passenger may be based on sensor data received from one or more sensor(s) 108 of the vehicle. In some examples, the detection of the passenger may be based on a signal received, such as from a computing device associated with the passenger, indicating the passenger presence in the vehicle. In various examples, the vehicle computing system may decrease a volume and/or volume range and/or frequencies of an audio warning signal based on the detection of the passenger, such as, for example, to not create a negative experience for the passenger due to the emission of a loud noise.

In various examples, the warning signal component 114 may generate (e.g., determine the first set of characteristics) and/or cause the first warning signal to be emitted based on a location associated with the vehicle 104. The location may include a school zone, a construction zone, proximity to a playground, a business district, a downtown area, or the like. In some examples, the warning signal component 114 may generate and/or cause the first warning signal to be emitted based on a time of day, day of the week, season, date (e.g., holiday, etc.), or the like. In some examples, the warning signal component 114 may generate and/or cause the first warning signal to be emitted based on a speed associated with the vehicle 104. In such examples, based on a determination that the vehicle 104 is traveling at or below a threshold speed (e.g., 28 kilometers per hour, 22 miles per hour, 15 miles per hour, etc.), the warning signal component 114 may cause the first warning signal to be emitted.

In various examples, the computing system(s) 102 may be configured to determine that the object(s) 106, such as object 106(1) and 106(2) are relevant to the vehicle 104 (e.g., a potential conflict between the vehicle 104 and object 106 may exist, object 106 may potentially slow forward progress of the vehicle 104). In various examples, an object relevance may be determined utilizing the techniques described in U.S. patent application Ser. No. 16/389,720, filed Apr. 19, 2019, and entitled "Dynamic Object Relevance Determination," U.S. patent application Ser. No. 16/417,260, filed May 20, 2019, and entitled "Object Relevance Determination," and U.S. patent application Ser. No. 16/530,515, filed Aug. 2, 2019, and entitled "Relevant Object Detection," the entire contents of which are incorporated herein by reference.

In some examples, object relevance may be determined based on a distance (D) between the object 106(1) and a drivable surface 116 (e.g., a roadway, lane in which the vehicle 104 operates, etc.). In such examples, the object 106 may be determined to be relevant based on the distance (D) being equal to or less than a threshold distance (e.g., 18 inches, 1 foot, 4 meters, etc.). In various examples, the threshold distance may be determined based on the classification 112 associated with the object 106. For example, a first threshold distance associated with a pedestrian may be 1 meter and a second threshold distance associated with a cyclist may be 5 meters.

In various examples, the object 106 may be determined to be relevant based on an object trajectory associated therewith. In such examples, the computing system(s) 102 may be configured to determine a predicted object trajectory (e.g., object trajectory), such as based on the sensor data. In some examples, the object trajectory may be based on a top-down representation of an environment, such as by utilizing the techniques described in U.S. patent application Ser. No. 16/151,607, filed Oct. 4, 2018 and entitled "Trajectory Prediction on Top-Down Scenes," and in U.S. patent application Ser. No. 16/504,147, filed Jul. 5, 2019 and entitled "Prediction on Top-Down Scenes based on Action Data," the entire contents of which are incorporated herein by reference. In some examples, the predicted object trajectory may be determined using a probabilistic heat map (e.g., discretized probability distribution), tree search methods, temporal logic formulae, and/or machine learning techniques to predict object behavior, such as that described in U.S. patent application Ser. No. 15/807,521, filed Nov. 8, 2017, and entitled "Probabilistic Heat Maps for Behavior Prediction," the entire contents of which are incorporated herein by reference.

In various examples, the object 106 may be relevant to the vehicle 104 based on an intersection between the object trajectory and a vehicle trajectory. In some examples, the object 106 may be relevant based on predicted locations of the object 106 and the vehicle 104 on the respective trajectories. In some examples, the object 106 may be relevant to the vehicle 104 based on a determination that a predicted future object location associated with the object 106 traveling on the object trajectory is within a threshold distance (e.g., 2 feet, 10 feet, 2 meters, 4 meters, etc.) of a predicted future vehicle location associated with the vehicle 104 traveling on the vehicle trajectory.

In various examples, the object 106 may be relevant to the vehicle 104 based on a probability of conflict (e.g., likelihood of collision) between the object 106 and the vehicle 104. The probability of conflict may be based on a determined likelihood that the object 106 will continue on the object trajectory and/or alter the object trajectory to one that conflicts with the vehicle 104. In some examples, the probability of conflict may correspond to a likelihood (e.g., probability) of conflict between the vehicle 104 and the object 106 being above a threshold level (e.g., threshold probability) of conflict.

In various examples, the vehicle computing system may determine the probability of conflict utilizing a top down representation of the environment, such as that described in the U.S. patent applications incorporated herein above. In some examples, the vehicle computing system may input the top down representation of the environment into a machine learned model configured to output a heat map indication predicting probabilities associated with future positions of the object 106 (e.g., predicting object trajectories and/or probabilities associated therewith). In such examples, the vehicle computing system may project the movement of the vehicle 104 forward in time and determine a probability of conflict between an amount of overlap between the heat map associated with the object 106 and future positions of the vehicle 104 as determined by the projection forward in time.

In some examples, the probability of conflict may be determined based on a classification 112 associated with the object 106. In such examples, the classification 112 associated with the object 106 may assist in determining the likelihood that the object 106 will maintain or alter a trajectory. For example, a deer detected on a side of a roadway may be unpredictable and thus may have a high likelihood of altering a trajectory to conflict with the vehicle 104. As such, the deer may be determined to be an object 106 that may potentially conflict with (e.g., is relevant to) the vehicle 104.

In some examples, based on a determination of relevance, the warning signal component 114 of the computing system(s) 102 may generate the first warning signal to alert the relevant object(s) 106 in the environment of the vehicle 104 presence and/or operation. As discussed above, a first set of characteristics (e.g., frequency, volume, luminosity, color, shape, motion, etc.) of the first warning signal may be determined based on classifications 112 associated with the relevant object(s) 106.

In various examples, the first warning signal may be emitted via one or more emitters 118 on the vehicle 104. The emitter(s) 118 may include speakers, lights, displays, projectors, and/or any other device configured to emit a signal. In some examples, the first warning signal may be emitted in a plurality of directions around the vehicle (e.g., substantially equally in front of, behind, and on the sides of the vehicle 104). In some examples, the first warning signal may be emitted uniformly in multiple directions around the vehicle 104. For example, an electric vehicle warning sound may be emitted via speakers mounted on corners of the vehicle 104 and configured to broadcast the first warning signal substantially equally around the vehicle 104.

In some examples, the warning signal component 114 may be configured to cause the first warning signal to be emitted toward the relevant object(s) 106 and/or toward detected objects 106 in the environment 100. In some examples, the first warning signal may be emitted via one or more emitters 118 substantially facing a direction in which the object(s) 106 (e.g., detected objects, relevant objects, etc.) are detected. For example, objects 106 may be detected on ahead of and on a right side of the vehicle 104 (e.g., on the sidewalk adjacent to the drivable surface 116). Based on the detection of the objects ahead of and on the right side of the vehicle 104, the warning signal component 114 may cause the first warning signal to be emitted via emitter(s) 118 mounted on the front and right side of the vehicle 104. In some examples, the first warning signal may be emitted toward the relevant object(s) 106 and/or toward detected objects 106 in the environment 100 utilizing beam steering and/or beamformed array techniques, such as that described in U.S. Pat. No. 9,878,664, issued May 4, 2017 and entitled "Method for Robotic Vehicle Communication with an External Environment via Acoustic Beam Forming," the entire contents of which are incorporated herein by reference.

In some examples, the warning signal component 114 may be configured to continually and/or periodically (e.g., every 0.5 seconds, 3.0 seconds, etc.) modify the first warning signal to generate the second warning signal, and so on. In some examples, the modification to the warning signals may be based at least in part on additional sensor data processed by the computing system(s) 102. For example, the warning signal component 114 may cause the first warning signal to be emitted at a first time, at least one characteristic thereof being determined based on a baseline noise level in the environment. The vehicle computing system may determine an increase in the baseline noise level at a second time and the warning signal component 114 may generate a second warning signal to be emitted at a higher volume.

In various examples, the warning signal component 114 may be configured to determine an object reaction to the first warning signal. In such examples, the warning signal component 114 may be configured to determine a real-time object reaction to a warning signal. In some examples, the warning signal component 114 may receive processed sensor data from the perception component 110, such as that associated with an object reaction of the object(s) 106 in the environment 100. The object reaction may include a change (or lack thereof) in the object trajectory (e.g., speed increase, speed decrease, direction of travel away from the vehicle, etc.), a movement of the head and/or shoulders of the object, a gesture (e.g., a wave, etc.), a foot placement of the object, a positional adjustment to an item the object holds (e.g., adjusting a position of an electronic device, book, magazine, or other item), and/or any other movement indicative of an object reacting the first warning signal.

The warning signal component 114 may compare the object reaction to an expected reaction 120. The expected reaction may be based on the characteristic(s) of the first warning signal (e.g., volume, frequency, luminosity, color, motion (e.g., animated motion, light sequencing, etc.), shape of the signal, etc.) and/or data associated with the object(s) 106 (e.g., object attribute (e.g., classification 112, position (e.g., facing/moving toward the vehicle 104, facing/moving away from the vehicle 104, etc.), distance (D) from the vehicle 104, object trajectory, etc.), object activity (e.g., walking, running, riding a scooter, (e.g., a particular activity implied by an object trajectory, such as based on speed, etc.), reading a book, talking on a phone, viewing data on an electronic device, interacting with another vehicle, interacting with another object 106 (e.g., talking to another person, looking into a stroller, etc.), eating, drinking, operating a sensory impairment device (e.g., cane, hearing aid, etc.), listening to headphones, etc.). In some examples, the warning signal component 114 may access a database 122 including a plurality of expected reactions to determine the expected reaction 120 associated with the first warning signal. In such examples, the expected reactions 120 in the database 122 may be stored based at least in part on the data associated with the object 106 and/or characteristic(s) of the first warning signal. For example, the database 122 may include an expected reaction 120(1) of the object 106(1), a pedestrian viewing an electronic device, to include lowering the electronic device the object 106(1) is viewing and/or moving the head and/or shoulders toward the vehicle 104 (e.g., emission of the first warning signal). For another example, the database 122 may include an expected reaction 120(2) of the object 106(2), a cyclist, to include a change in object trajectory (e.g., increase in speed, decrease in speed, change of direction of travel, etc.) and/or a head movement. In the illustrative example, the database 122 may be located on the autonomous vehicle 104 separate from the computing system(s) 102. In such examples, the database 122 may be accessible to the computing system(s) 102 via a wired and/or wireless connection. In some examples, the database 122 may be remote from the computing system(s) 102, such as that stored on a remote computing system and accessible via the wireless connection. In yet other examples, the database 122 may be located on the computing system(s) 102.

As illustrated with respect to object 106(2), the expected reaction 120(2) may include a change in trajectory associated with the object 106(2). The change in the trajectory may include a modification to the speed (e.g., speed up, slow down, change speed a threshold amount, etc.) and/or direction the object 106(2) travels. In various examples, the computing system 102 may determine an updated predicted object trajectory based on additional sensor data from the sensors at a time after emitting the first warning signal. In some examples, the updated predicted object trajectory may be determined utilizing the top-down representation of the environment and/or heat maps associated therewith, such as that described in the U.S. patent applications incorporated herein by reference above. In various examples, the computing system(s) 102 may determine a modification to the object trajectory (e.g., difference between the predicted object trajectory and the updated predicted object trajectory determined after emitting the first warning signal). In some examples, the expected reaction may be based on the modification. For example, the expected reaction may include an object slowing a forward speed or changing a direction of travel (e.g., from an intersecting trajectory to a parallel trajectory with the vehicle 104). The computing system(s) 102 may compare the modification and/or updated object trajectory to the expected reaction 120(2) to determine whether the object 106(2) reacts in accordance with the expected reaction.

In some examples, the computing system(s) 102 may determine that the first warning signal was successful in alerting the object 106 based on a determination that the object reacts (e.g., modifies behavior) within a threshold time (e.g., 1 second, 2 seconds, etc.) of emitting the first warning signal. In some examples, the computing system(s) 102 may store the response associated with the reaction in the database 122. In various examples, despite detecting an unexpected reaction (e.g., not the expected reaction), the computing system(s) 102 may continue to iteratively modify warning signals until the expected reaction is detected. In such examples, the computing system(s) may store data associated with each iteration of the warning signal and corresponding reactions (expected and/or unexpected) in the database 122.

In various examples, the vehicle computing system may determine an expected reaction 120 utilizing machine learning techniques. As will be discussed in greater detail below with regard to FIG. 4, in some examples, the computing system(s) 102 may include a reaction training component configured to train a model utilizing machine learning techniques to determine an expected reaction 120 to a warning signal. In such examples, the model may be trained with training data including a plurality of warning signals and detected reactions thereto.

Based on the comparison between the object reaction (e.g., actual reaction, real-time reaction, etc.) and the expected reaction 120, the warning signal component 114 may determine whether the object 106 reacted as expected to the first warning signal (e.g., whether a substantial match exists between the object reaction and the expected reaction 120). In various examples, a determination of a substantial match between the object reaction and the expected reaction 120 may include a match of a threshold number of actions (e.g., one matching actions, two matching actions, etc.), a threshold percentage of actions (e.g., 80%, 55%, etc.), or the like. In some examples, the substantial match may be determined based on a threshold match and/or threshold difference between the object reaction and the expected reaction 120. The actions may include trajectory modifications (e.g., increase in speed, decrease in speed, change in direction of travel, etc.), body movements (e.g., foot placement, head rotation, shoulder movement, etc.), gestures, or the like. For example, an expected reaction 120(1) to the first warning signal may include a head and/or shoulder movement and a positional adjustment to an electronic device the object 106(1) holds. The actual object reaction may include a head movement toward the vehicle 104. Based on a match of at least the head movement, the warning signal component 114 may determine that the object reaction and the expected reaction 120 substantially match. For another example, an expected reaction 120(2) to the first warning signal may include a head movement, a modification to an object trajectory, and/or a magnitude of the modification to the object trajectory. The warning signal component 114 may receive an indication, such as from a prediction component, that a speed associated with the object trajectory has decreased by 5 miles per hour. Based in part on the object trajectory modification and magnitude thereof, the warning signal component may determine that the object reaction matches the expected reaction 120(2) at 85%, above a 75% threshold percentage of actions, and that the object reaction substantially matches the expected reaction 120(2).

Responsive to a determination that the object reaction substantially matches the expected reaction 120, the vehicle computing system may store the encounter (e.g., data associated with first warning signal and the object reaction) in the database 122. In some examples, the database 122 may be used for future object reaction comparisons, such as to increase a confidence in an object reaction to the first warning signal, to train the machine learned model, or the like.

Responsive to a determination that the object reaction did not substantially match (e.g., less than the threshold number of actions, percentage match, etc.), the warning signal component 114 may determine that the object 106 did not react according to an expected reaction 120. In such examples, the warning signal component 114 may determine that the object 106 remains unaware of the vehicle 104 operation and/or presence of the vehicle 104 in the environment 100. Based on a determination that the object 106 did not react according to the expected reaction 120, the warning signal component 114 may generate a second warning signal. The second signal may include an audio and/or visual signal. The second warning signal may include a signal of a same or a different modalit(ies) (e.g., light, sound, etc.) from the first warning signal. For example, the first warning signal may include a sound emission and the second warning signal may include a light emission. For another example, the first warning signal may include a sound emission and the second warning signal may include a sound emission.

In various examples, the warning signal component 114 may determine a second set of characteristics (e.g., frequency, volume, luminosity, color, motion (e.g., animated motion, light sequencing, etc.), shape of the signal, etc.) of the second warning signal. In some examples, the second set of characteristics may include a pre-determined modification to one or more of the characteristics of the first warning signal. In such examples, the warning signal component 114 may modify one or more of the frequenc(ies), volume, and/or luminosity of the first warning signal to generate the second warning signal. For example, a volume associated with a second warning signal may include a 10 decibel increase from the first warning signal.

In various examples, the second set of characteristics may be determined dynamically, such as based on real-time conditions in the environment 100, as discussed above. In some examples, the warning signal component 114 may process the real-time considerations and a failure to react to the first warning signal and may determine the second set of characteristics associated with the second warning signal. In some examples, the warning signal component 114 may access the database 122 to determine the second set of characteristics associated with the second signal. In some examples, the second set of characteristics may be stored in the database 122 based on the real-time considerations. In various examples, the second set of characteristics may be determined utilizing machine learning techniques. In some examples, the warning signal component 114 may input the real-time considerations and the first set of characteristics with an indication that the first warning signal was unsuccessful into a machine learned model configured to output the second set of characteristics. In such examples, the warning signal component 114 may generate the second warning signal according to the output second set of characteristics.

In various examples, the second set of characteristics may be based in part on an escalation of urgency, such as from a low urgency to medium or high urgency, an increase in a likelihood and/or probability of conflict, such as from a medium probability to a high probability, or the like. For example, the warning signal component 114 may cause a first warning signal to be emitted at a first frequency and first volume to alert an object 106, such as object 106(1), that is within a threshold distance of the drivable surface 116 of the vehicle operation. Based on a determination that the object 106(1) did not react according to an expected reaction 120(1), and that the vehicle 104 has moved closer to a location associated with the object 106(1), the vehicle computing system may determine that the urgency associated with the notification and/or a probability of conflict has increased. Accordingly, the warning signal component 114 may determine to modify a frequency and/or increase a volume of the first warning signal to generate the second warning signal.

In various examples, the second set of characteristics may include a pre-determined modification to the first set of characteristics. In such examples, one or more of the first set of characteristics may be modified by a pre-defined amount to determine the second set of characteristics. In some examples, the pre-defined modifications may be stored in the database 122, such as in association with the first warning signal and/or characteristics thereof, the data associated with the object 106, or the like. For example, a volume associated with the second warning signal may include a 10 decibel increase over the first warning signal. For another example, the second warning signal may include a 100 lumen increase over the first warning signal.

In various examples, the warning signal component 114 may compare a second object reaction to a second expected reaction 120 associated with the second warning signal. Responsive to a determination that the second object reaction substantially matches the second expected reaction 120, the warning signal component 114 may store data associated with the object reaction and/or the second warning signal in the database 122. As discussed above, in some examples, the database 122 may be used for future object reaction comparisons, such as to increase a confidence in a reaction to a warning signal, to train the machine learned model, or the like.

Responsive to a determination that the second object reaction does not substantially match the second expected reaction 120, the warning signal component 114 may generate and cause a third warning signal to be emitted, the third warning signal being different from the first warning signal and the second warning signal (e.g., different modality, different characteristics, etc.). For example, based on a determination that the object 106 did not respond to a first audio warning signal emitted at 50 decibels and a second audio warning signal emitted at 70 decibels, the warning signal component 114 may determine to emit a visual warning signal as the third warning signal. Accordingly, the warning signal component 114 may determine a color and luminosity of the visual warning signal (e.g., third set of characteristics associated with the third warning signal). The warning signal component 114 may utilize similar or the same techniques as those described above with regard to determining a third set of characteristics associated with the third warning signal.

In various examples, the vehicle computing system may continue to modify emitted warning signals until an object reaction substantially matches an expected reaction 120 to the warning signal. In various examples, the warning signal component 114 may continue to modify emitted warning signals based on a determination that the object 106 remains relevant to the vehicle 104. In such examples, a modified warning signal may be emitted based on a determination that the object 106 is relevant to the vehicle 104. In some examples, the warning signal component 114 may be configured to continually and/or periodically (e.g., every 0.1 seconds, 1.0 seconds, prior to generating a modified warning signal, etc.) determine whether the object 106 is relevant to the vehicle 104. In some examples, the warning signal component 114 may receive an indication of object 106 relevance from another component of the computing system(s) 102. In various examples, the indication of object 106 relevance may be received responsive to a query of relevance sent by the warning signal component 114. In such examples, the warning signal component 114 may send the query of relevance prior to generating a modified warning signal, such as to verify object 106 relevance prior to expending computing resources to generate the modified warning signal. In such examples, the techniques described herein may improve the functioning of the computing system(s) 102, at least by making available additional computing resources (processing power, memory, etc.) to other functions of the computing system(s) 102 based on a determination of object 106 irrelevance.

In various examples, based on a determination that the object 106 reacted in accordance with an expected reaction 120 and/or that the object 106 is irrelevant to the vehicle 104, the warning signal component 114 may cease emitting warning signals. In some examples, based on the determination that the object 106 reacted in accordance with the expected reaction 120 and/or the object 106 is irrelevant to the vehicle 104, the warning signal component 114 may cause the first warning signal to be emitted. In such examples, the first warning signal may include a baseline warning signal emitted to alert nearby objects of the vehicle 104 presence and/or operation. For example, and as discussed above, the baseline warning signal may include an electric vehicle warning sound, such as that required by law and/or regulation. For another example, the baseline warning signal may include a sound and/or light emitted based on a location associated with the vehicle 104 and/or real-time conditions such as those described above.

Figure 2:
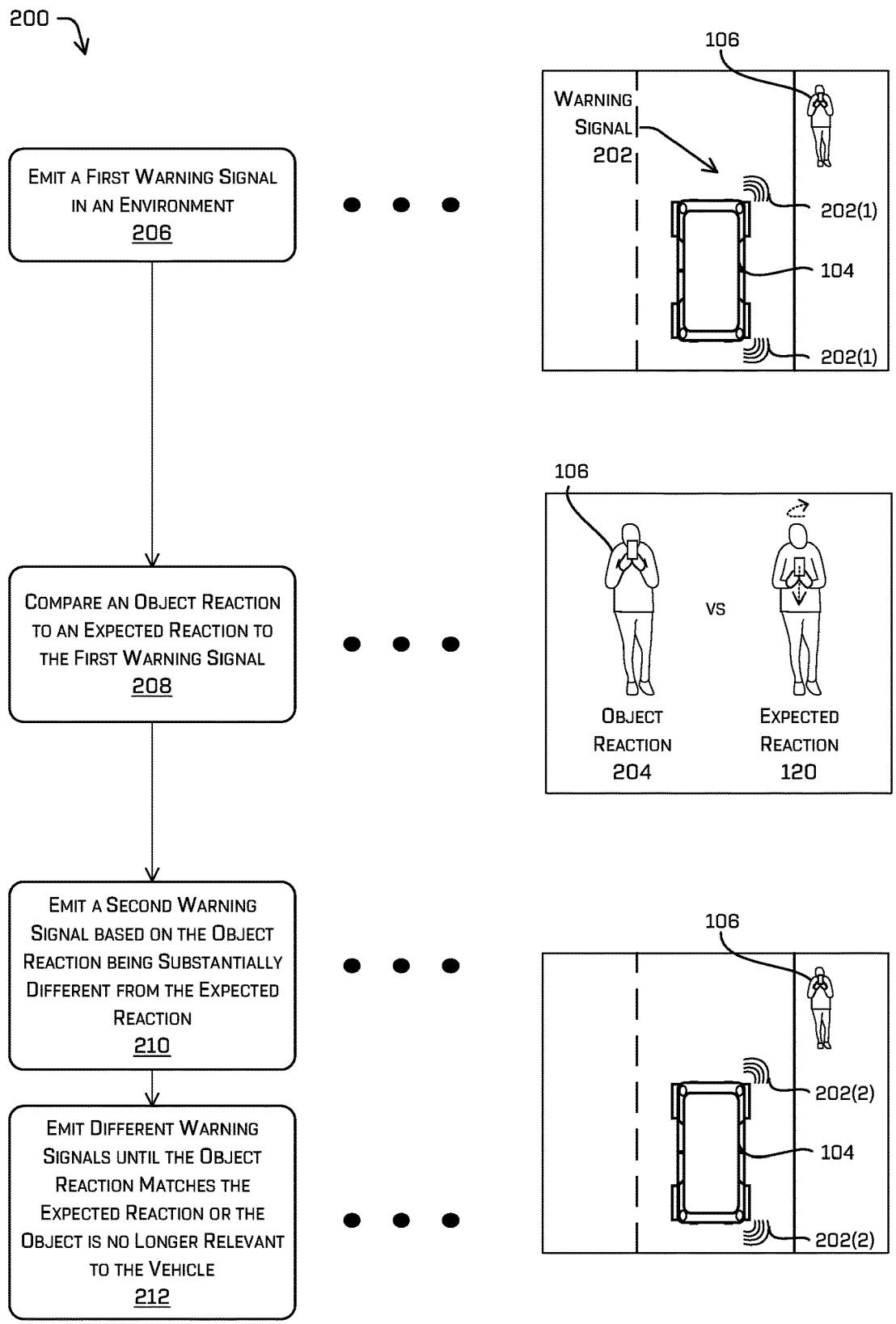
FIG. 2 is an illustration of a process for modifying warning signals emitted by a vehicle based at least in part on a detected object reaction to the emitted warning signals.

FIG. 2 is an illustration of a process 200 for modifying a warning signal 202 emitted by a vehicle 104 based at least in part on an object reaction 204 of an object 106 to the emitted warning signal 202.

At operation 206, the process may include emitting a first warning signal 202(1) in an environment, such as environment 100. The first warning signal 202(1) may include an audio and/or a visual signal. The first warning signal 202(1) may include a first set of characteristics (e.g., frequency, volume, luminosity, color, motion (e.g., animated motion, light sequencing, etc.), shape of the signal, etc.). In some examples, the first set of characteristics associated with the first warning signal 202(1) may be pre-defined, such as based on a baseline sound emitted from the vehicle 104 to alert objects 106 of the presence and/or operation of the vehicle 104. For example, the first warning signal 202(1) may include an electric vehicle warning sound with a frequency of 528 Hertz emitted at 100 decibels.

In various examples, a vehicle computing system associated with the vehicle 104 may determine the first set of characteristics based on one or more real-time conditions in the environment. As discussed above, the real-time conditions may include data associated with the object 106 (e.g., object attribute (e.g., classification, position (e.g., facing/moving toward the vehicle, facing/moving away from the vehicle, etc.), distance from the vehicle, trajectory, etc.), object activity (e.g., walking, running, riding a scooter, (e.g., a particular activity implied by an object trajectory, such as based on speed, etc.), reading a book, talking on a phone, viewing data on an electronic device, interacting with another vehicle, interacting with another object (e.g., talking to another person, looking into a stroller, etc.), eating, drinking, operating a sensory impairment device (e.g., cane, hearing aid, etc.), listening to headphones, etc.), environmental factors (e.g., noise level in the environment, amount of traffic, road conditions, etc.), weather conditions (e.g., rain, snow, hail, wind, etc.), vehicular considerations (e.g., speed, passengers in the vehicle 104, etc.), and the like. For example, the vehicle computing system may determine that a detected object 106 is a pedestrian walking in the rain toward the vehicle 104 and within a threshold distance of the vehicle 104. Due to the object trajectory, the object location within the threshold distance of the vehicle 104, and the rain, the vehicle computing system may determine to emit a 1000 Hertz signal at 100 decibels.

In the illustrative example, the first warning signal 202(1) may be emitted on a side of the vehicle 104 associated with the detected object 106. In such an example, the first warning signal 202(1) may be configured to alert objects 106 in a bike lane, on a sidewalk, and/or other area in which the vehicle computing system detects objects 106 and/or reasonably expects objects to operate (e.g., lawful areas of operation, typical areas of operation, etc.). In some examples, the first warning signal 202(1) may be emitted around the vehicle, such as toward the front, rear, right side and left side. In some examples, the first warning signal 202(1) may include an acoustic beamformed signal and/or light signal directed at the object 106.

At operation 208 the vehicle computing system may compare an object reaction 204 to an expected reaction 120 to the first warning signal 202(1). As discussed above, the vehicle computing system may determine the object reaction 204 based on sensor data from one or more sensors. The sensors may include sensors mounted on the vehicle, mounted on other vehicles, and/or mounted in the environment. The object reaction 204 may include a real-time object reaction to the first warning signal 202(1), such as a change or lack thereof to an object trajectory, position, and/or movement of the object 106. In the illustrative example, the object reaction 204 includes the substantial lack of movement. For example, a position of the object 106 (e.g., head, shoulders, arms, legs, etc.) remains substantially the same and the object 106 continues to hold an electronic device in substantially the same position.

The expected reaction 120 may be based on the characteristic(s) of the first warning signal 202(1) (e.g., volume, frequency, luminosity, color, motion (e.g., animated motion, light sequencing, etc.), shape of the signal, etc.) and/or data associated with the object 106 (e.g., object attribute (e.g., classification, position (e.g., facing/moving toward the vehicle, facing/moving away from the vehicle, etc.), distance from the vehicle, trajectory, etc.), object activity (e.g., walking, running, riding a scooter, (e.g., a particular activity implied by an object trajectory, such as based on speed, etc.), reading a book, talking on a phone, viewing data on an electronic device, interacting with another vehicle, interacting with another object (e.g., talking to another person, looking into a stroller, etc.), eating, drinking, operating a sensory impairment device (e.g., cane, hearing aid, etc.), listening to headphones, etc.). In some examples, the vehicle computing system may access a database including a plurality of expected reactions to determine the expected reaction 120 associated with the first warning signal 202(1). In such examples, the expected reactions 120 in the database may be stored based at least in part on the data associated with the object 106 and/or characteristic(s) of the first warning signal 202(1). In various examples, the vehicle computing system may determine the expected reaction 120 utilizing machine learning techniques. In the illustrative example, the expected reaction 120 includes a head movement (e.g., rotation) toward the vehicle 104 and a movement of an electronic device from an elevated position (e.g., in front of the object's head) to a lower position.

At operation 210, the process includes emitting a second warning signal based on the object reaction 204 being substantially different from the expected reaction 120. In various examples, the vehicle computing system may determine that the object 106 did not process the first warning signal 202(1) (e.g., object 106 did not hear and/or see the first warning signal 202(1)) based on the substantial difference between the object reaction 204 and the expected reaction 120.

A determination of substantial difference may be based on one or more actions associated with the object reaction 204 differing from one or more actions of the expected reaction 120. The actions may include trajectory modifications (e.g., increase in speed, decrease in speed, change in direction of travel, etc.), body movements (e.g., foot placement, head rotation, shoulder movement, etc.), gestures, or the like. In some examples, the object reaction 204 may be determined to be substantially different from the expected reaction 120 based on a determination that a threshold number of actions and/or threshold percentage of actions are different (e.g., threshold difference). For example, an expected reaction may include a foot placement, a head movement and a shoulder movement. Based on a determination that an object reaction only includes a foot placement, the vehicle computing system may determine that a threshold number of actions (two) is not met and, therefore, the object reaction is substantially different from the expected reaction.

The second warning signal 202(2) may include a signal of the same or a different modality from the first warning signal 202(1). The second warning signal 202(2) may include a second set of characteristics. In various examples, the vehicle computing system may determine the second set of characteristics based on a pre-defined adjustment to the first set of characteristics. In such an example, the vehicle computing system may modify a frequency, volume, luminosity, color, motion, and/or shape of the first warning signal 202(1) based on the pre-defined adjustment. For example, a first warning signal 202(1) may include an audio signal of a first frequency emitted at 65 decibels. Based on a determination that the object 106 did not react according to an expected reaction, the vehicle computing system may increase the volume 15 decibels and emit a second warning signal 202(2) at 80 decibels.

In the illustrative example, the vehicle computing system may cause the second warning signal 202(2) to be emitted on a same side of the vehicle 104 as the first warning signal 202(1) (e.g., on a side of the vehicle 104 associated with the detected object 106). In other examples, the vehicle computing system may cause the second warning signal 202(2) to be directed at the object 106, such as in the acoustic beamformed signal and/or light signal. In yet other examples, the second warning signal 202(2) may be emitted around the vehicle, such as toward the front, rear, right side, and left side of the vehicle 104.

At operation 212, the process includes emitting different warning signals 202 until the object reaction 204 matches (e.g., substantially matches) the expected reaction 120 or the object 106 is no longer relevant to the vehicle 104. In various examples, the vehicle computing system may be configured to continuously modify warning signals based on real-time object reactions in order to optimize the safe operation of the vehicle 104 in the environment.

In various examples, the vehicle computing system may generate different warning signals 202 of a same modality and/or different modalities. In some examples, the vehicle computing system may emit a pre-determined number of warning signals 202 in a first modality and may change to a second modality. In such examples, the vehicle computing system may determine that the first modality is ineffective in alerting the object 106 of the vehicle 104 presence and/or operation. For example, the vehicle computing system may emit three audio warning signals 202 and may determine, based on a substantial difference between the object reactions 204 to the audio signals and expected reactions 120 thereto, that the audio signals are ineffective, such as due to the object 106 being hard of hearing, listening to loud music, or the like. The vehicle computing system may modify the fourth warning signal 202 (and subsequent warning signals 202) to visual warning signals 202, such as flashing lights of various colors, motions (e.g., sequencing), shapes, and/or intensity.

In various examples, the vehicle computing system may be configured to continuously and/or periodically (e.g., every 0.2 seconds, 0.5 seconds, prior to generating a modified warning signal, etc.) determine whether the object 106 is relevant to the vehicle 104. In some examples, prior to generating a subsequent warning signal 202 (such as after a determination that the object reaction 204 is substantially different from the expected reaction 120), the vehicle computing device may determine object relevance to the vehicle 104. The object 106 may be relevant to the vehicle 104 based on an intersection between an object trajectory and a vehicle trajectory. The object trajectory may be determined utilizing the techniques described above and in the patent applications incorporated by reference above. In some examples, the object 106 may be relevant based on predicted locations of the object 106 and the vehicle 104 on the respective trajectories.

In some examples, the object 106 may be relevant to the vehicle 104 based on a determination that a predicted future object location associated with the object 106 traveling on the object trajectory is within a threshold distance (e.g., 4 feet, 12 feet, 1 meters, 3 meters, etc.) of a predicted future vehicle location associated with the vehicle 104 traveling on the vehicle trajectory. In various examples, the object 106 may be determined to be relevant to the vehicle 104 based on a location of the object 106 being in front of the vehicle 104 (e.g., ahead of the vehicle 104 traveling in a direction) and a distance between the object 106 and a drivable surface (e.g., a road) on which the vehicle 104 is traveling on the trajectory (e.g., distance from the object to a path of the vehicle 104). In such examples, the object 106 may be relevant based on a determination that the distance is equal to or less than a threshold distance.

In various examples, based on a determination that the object 106 reacted in accordance with an expected reaction 120 and/or that the object 106 is irrelevant to the vehicle 104, the vehicle computing device may cease emitting warning signals 202. In some examples, based on the determination that the object 106 reacted in accordance with the expected reaction 120 and/or the object 106 is irrelevant to the vehicle 104, the warning signal component 114 may cause the first warning signal 202(1) to be emitted. In such examples, the first warning signal may include a baseline warning signal 202 emitted to alert nearby objects 106 of the vehicle 104 presence and/or operation. For example, the baseline warning signal may include a sound and/or light emitted based on a location associated with the vehicle 104 and/or real-time conditions such as environmental factors, weather conditions, vehicular considerations, data associated with the object 106, and the like.

Figure 3:
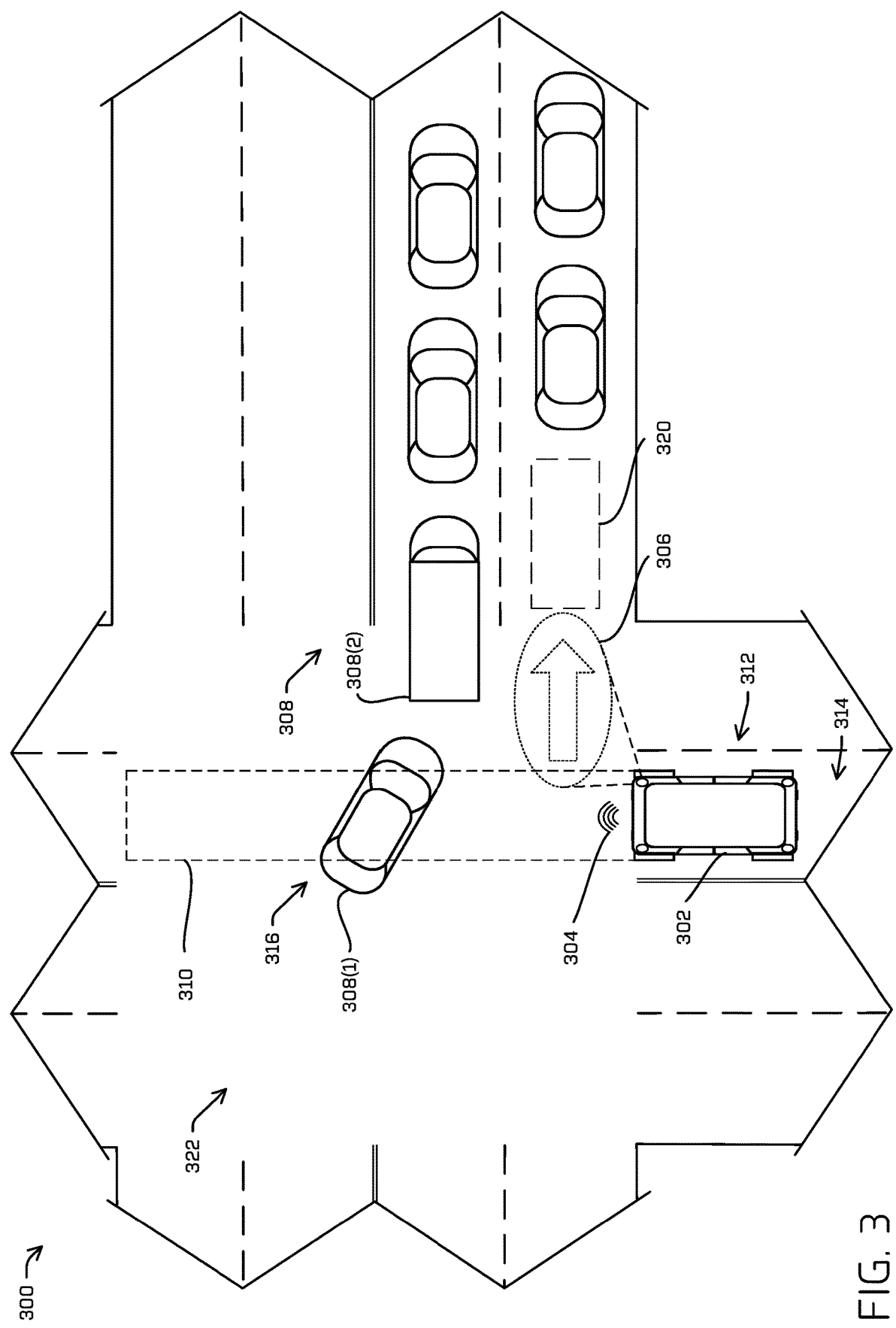
FIG. 3 is an illustration of an environment in which a vehicle emits signals based on a determination that an object is blocking a vehicle path of the vehicle, the signals including a warning signal to alert the object of the blocking and an object path signal to indicate a potential object path for the object.

FIG. 3 is an illustration of an environment 300 in which a vehicle 302, such as vehicle 104 emits signals 304 and 306 based on a determination that an object 308(1) is blocking a vehicle path 310 of the vehicle 302. The signals may include a warning signal 304, such as warning signal 202 to alert the object 106 of the presence and/or operation of the vehicle 302, and a routing signal 306 to indicate a potential object path for the object 106. A vehicle computing system associated with the vehicle may be configured to detect objects 308, such as object(s) 106, in the environment based at least in part on sensor data received from one or more sensors of the vehicle and/or one or more remote sensors (e.g., sensors associated with other vehicles, sensors mounted in the environment 300, etc.).

In various examples, a vehicle computing system, such as computing system(s) 102, may be configured to determine that an object 308 (e.g., blocking object 308(1)) is blocking the vehicle path 310 (path 310) associated with vehicle 302 travel through the environment 300. In some examples, the vehicle path 310 may include a path of the vehicle 302 from a current location 312 to a destination. In some examples, the vehicle path 310 may include a drivable surface (e.g., drivable area) associated with the vehicle 302 travel to the destination. In some examples, the drivable surface may include a width of the vehicle 302 and/or a safety margin on either side of the vehicle 302. In some examples, the drivable surface may include the width of a lane 314 in which the vehicle 302 is traveling.

In some examples, the vehicle computing system may determine that the blocking object 308(1) is blocking the vehicle path 310 based on a determination that an object location 316 associated with the blocking object(s) 308(1) is at least partially within the drivable area and/or the vehicle path 310. In various examples, the vehicle computing system may determine that the blocking object 308(1) is blocking the vehicle path 310 based on a determination that the vehicle 302 is not able to proceed around the blocking object 308(1) in the lane 314. In the illustrative example, the blocking object 308(1) is stopped across the vehicle path 310 and is blocking the lane 314. In such an example, the vehicle 302 may be unable to proceed along the vehicle path 310 in the lane 314 (or an adjacent lane 318). In other examples, the blocking object 308(1) may be blocking less of the lane 314 (e.g., smaller percentage of the blocking object 308(1) blocking the vehicle path 310); however, the vehicle computing system may determine that the object 308 is a blocking object 308(1) based on a determination that the vehicle 302 is unable to circumnavigate the blocking object 308(1) while remaining within the confines of the lane 314.

In various examples, the vehicle computing system may be configured to identify an area 320 into which the blocking object 308(1) may move. In some examples, the area 320 may include a location that is not in the vehicle path 310, the lane 314, and/or the adjacent lane 318. In such examples, the area 320 may include a location to which the blocking object 308(1) may move to no longer block progress of the vehicle 302 and/or other vehicles/objects 308 traveling in the lane 314 and/or the adjacent lane 318.

In some examples, the area 320 may include a location that the operator of the blocking object 308(1) may be unable to view, such as based on a viewing path being blocked by another object, such as object 308(2). For example, the blocking object 308(1) may be turning left in an intersection 322 in front of the vehicle 302. The blocking object 308(1) may be operating in the left-hand lane behind the object 308(2). Due to the object location 316 and position (e.g., orientation partially through the left turn), the operator of the blocking object 308(1) may be unable to see whether the area 320 in the right-hand lane is clear of objects 308.

In various examples, the vehicle computing system may cause a routing signal 306 to be emitted from an emitter, such as emitter 118. In some examples, the routing signal 306 may include an indication of an object path (route) out of the vehicle path 310. In some examples, the routing signal 306 may indicate to the operator of the blocking object 308(1) that the area 320 exists and is clear. In the illustrative example, the routing signal 306 includes an arrow pointing to the area 320, the routing signal 306 projected (e.g., displayed) on a surface of the road such that the operator of the blocking object 308(1) may view the routing signal 306 from the object location 316. In another example, the routing signal 306 may include a holographic image providing an indication of the area 320 into which the blocking object 308(1) may move. Though depicted in FIG. 3 as an arrow, this is merely for illustrative purposes and other designs, shapes, symbols, and the like are contemplated here. For example, the routing signal 306 may include a flashing sequence of lights configured to indicate a route, such as an approach lighting system.

In various examples, the vehicle computing system may emit the routing signal 306 and may determine that the operator of the blocking object 308(1) is not reacting according to an expected reaction (e.g., operator is not moving the blocking object 308(1) toward the area 320. In some examples, based on a determination that the operator of the blocking object 308(1) is not reacting according to the expected reaction to the routing signal 306, the vehicle computing system may cause the warning signal 304 to be emitted, such as to alert the operator of the blocking object 308(1) of the routing signal 306 and/or the vehicle presence and/or operation. In some examples, the vehicle computing system may cause the warning signal 304 to be emitted to get the attention of the operator of the blocking object 308(1) prior to emitting the routing signal 306. The warning signal 304 may include an audio and/or a visual signal with a first set of characteristics (e.g., frequency, volume, luminosity, color, motion (e.g., animated motion, light sequencing, etc.), shape of the signal, etc.).

As discussed above, the vehicle computing system may be configured to detect a reaction of the operator of the blocking object 308(1) (e.g., operator reaction) to the warning signal 304. The vehicle computing system may detect the operator reaction based on sensor data collected from the sensors associated with the vehicle and/or the remote sensor(s). Due in part to limited visibility of vehicular operators provided by sensor data, the operator reaction may include a body movement, such as a head movement, shoulder movement, hand gesture (e.g., wave, etc.), and the like. As discussed above, the vehicle computing system may be configured to compare the operator reaction to an expected reaction, such as expected reaction 120. Additionally, in examples in which the vehicle computing system causes the routing signal 306 to be emitted concurrently with or prior to the warning signal 304, the expected reaction may include movement of the blocking object 308(1) toward the area 320. Based on the comparison, the vehicle computing system may determine whether the operator of the blocking object 308(1) is aware of the presence and/or operation of the vehicle 302 and/or the routing signal 306.

Based on a determination that the operator of the blocking object 308(1) is not aware of the presence and/or operation of the vehicle 302 (e.g., operator reaction did not substantially match the expected reaction) and/or the routing signal 306, the vehicle computing system may modify the warning signal 304. The modification may include a change in modality (e.g., audio signal to visual signal), frequency, volume, luminosity, color, motion, shape, or the like. In various examples, the vehicle computing system may emit a modified warning signal 304 to alert the operator of the blocking object 308(1) of the presence and/or operation of the vehicle 302 and/or the routing signal 306. As discussed above, the vehicle computing system may be configured to continually modify the warning signal 304 until the operator reaction substantially matches the expected reaction or the vehicle computing system determines that the blocking object 308(1) is irrelevant to the vehicle 302 (e.g., no longer blocking the path 310).

Though FIG. 3 is described with regard to a blocking object 308(1), this is not intended to be limiting, and the vehicle computing system may be configured to generate and emit the routing signal 306 for other (non-blocking) objects 308. For example, the vehicle computing system may detect an object 308 within a threshold distance of the vehicle 302. The vehicle computing system may determine, based on the object 308 being within the threshold distance and to maximize operational safety, to slow a forward speed of the vehicle 302 if the object 308 maintains a first location inside the threshold distance. The vehicle computing system may determine that, if the object moves to a second location outside the threshold location, that the vehicle 302 may not need to slow for optimal operational safety. The vehicle computing system may thus generate a routing signal 306 to indicate to the object 308 the second location for the object 308 to move so as to not impede forward progress of the vehicle 302.

Figure 4:
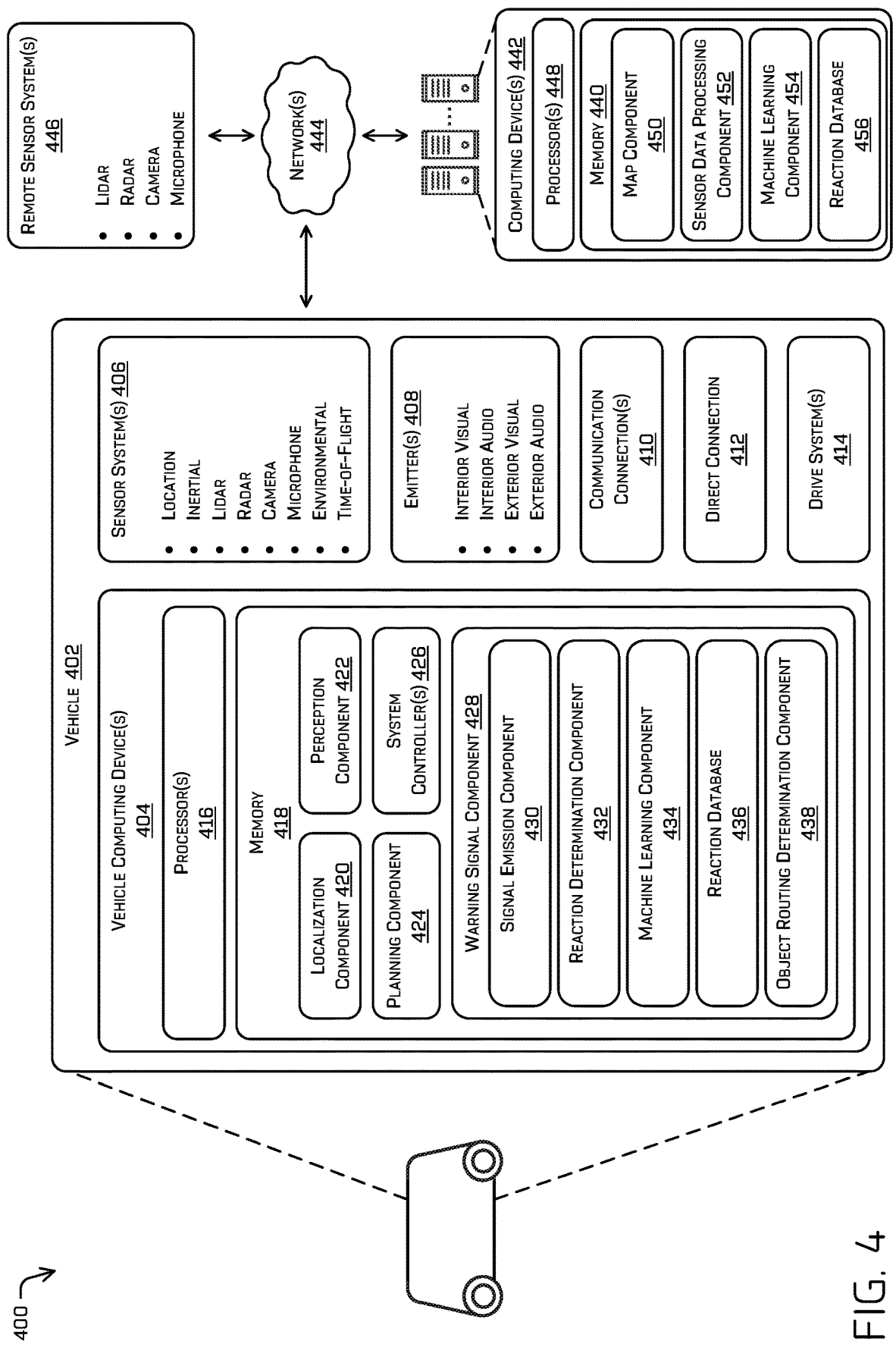
FIG. 4 is a block diagram of an example system for implementing the techniques described herein.

FIG. 4 is a block diagram of an example system 400 for implementing the techniques described herein. In at least one example, the system 400 may include a vehicle 402, such as vehicle 104.

The vehicle 402 may include one or more vehicle computing devices 404 (e.g., vehicle computing system), such as computing system(s) 102, one or more sensor systems 406, such as sensor(s) 108, one or more emitters 408, such as emitter(s) 118, one or more communication connections 410, at least one direct connection 412, and one or more drive systems 414.

The vehicle computing device(s) 404 may include one or more processors 416 and memory 418 communicatively coupled with the one or more processors 416. In the illustrated example, the vehicle 402 is an autonomous vehicle; however, the vehicle 402 could be any other type of vehicle, such as a semi-autonomous vehicle, or any other system having at least an image capture device (e.g., a camera enabled smartphone). In the illustrated example, the memory 418 of the vehicle computing device(s) 404 stores a localization component 420, a perception component 422, a planning component 424, one or more system controllers 426, and a warning signal component 428 including a signal emission component 430, a reaction determination component 432, a machine learning component 434, a reaction database 436, and an object routing determination component 438. Though depicted in FIG. 4 as residing in the memory 418 for illustrative purposes, it is contemplated that the localization component 420, a perception component 422, a planning component 424, one or more system controllers 426, and a warning signal component 428 (and/or the components and/or database illustrated therein) may additionally, or alternatively, be accessible to the vehicle 402 (e.g., stored on, or otherwise accessible by, memory remote from the vehicle 402, such as, for example, on memory 440 of one or more (remote) computing devices 442).

In at least one example, the localization component 420 may include functionality to receive data from the sensor system(s) 406 to determine a position and/or orientation of the vehicle 402 (e.g., one or more of an x-, y-, z-position, roll, pitch, or yaw). For example, the localization component 420 may include and/or request/receive one or more map(s) of an environment and may continuously determine a location and/or orientation of the autonomous vehicle within the map(s). For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In at least one example, a map may include a three-dimensional mesh of the environment. In some examples, the vehicle 402 may be controlled based at least in part on the map(s). That is, the map(s) may be additionally used in connection with the perception component 422 and/or the planning component 424 to determine a location of the vehicle 402, detect objects in an environment, and/or generate routes and/or trajectories to navigate within an environment.

In some examples, the one or more maps may be stored on a remote computing device(s) (such as the computing device(s) 442) accessible via network(s) 444. In some examples, multiple maps may be stored based on, for example, a characteristic (e.g., type of entity, time of day, day of week, season of the year, etc.). Storing multiple maps may have similar memory requirements but increase the speed at which data in a map may be accessed.

In various examples, the localization component 420 may be configured to utilize SLAM (simultaneous localization and mapping), CLAMS (calibration, localization and mapping, simultaneously), relative SLAM, bundle adjustment, non-linear least squares optimization, or the like to receive image data, lidar data, radar data, IMU data, GPS data, wheel encoder data, and the like to accurately determine a location of the vehicle 402. In some instances, the localization component 420 may provide data to various components of the vehicle 402 to determine an initial position of an autonomous vehicle 402 for determining a likelihood (e.g., probability) of conflict with an object, such as whether the object is relevant to the vehicle 402, as discussed herein.

In some examples, the perception component 422 may include functionality to perform object detection, segmentation, and/or classification. In some examples, the perception component 422 may provide processed sensor data that indicates a presence of an object (e.g., entity, dynamic object) that is proximate to the vehicle 402 and/or a classification of the object as an object type (e.g., car, pedestrian, cyclist, dog, cat, deer, unknown, etc.). In some examples, the perception component 422 may provide processed sensor data that indicates a presence of a stationary entity that is proximate to the vehicle 402 and/or a classification of the stationary entity as a type (e.g., building, tree, road surface, curb, sidewalk, unknown, etc.). In additional or alternative examples, the perception component 422 may provide processed sensor data that indicates one or more characteristics associated with a detected object (e.g., a tracked object) and/or the environment in which the object is positioned. In some examples, characteristics associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Characteristics associated with the environment may include, but are not limited to, a presence of another object in the environment, a state of another object in the environment, a time of day, a day of a week, a season, a weather condition (e.g., rain, sleet, hail, snow, temperature, humidity, etc.), an indication of darkness/light, etc.

In general, the planning component 424 may determine a path for the vehicle 402 to follow to traverse through an environment. For example, the planning component 424 may determine various routes and trajectories and various levels of detail. For example, the planning component 424 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planning component 424 may generate an instruction for guiding the vehicle 402 along at least a portion of the route from the first location to the second location. In at least one example, the planning component 424 may determine how to guide the vehicle 402 from a first waypoint in the sequence of waypoints to a second waypoint in the sequence of waypoints. In some examples, the instruction may be a trajectory, or a portion of a trajectory. In some examples, multiple trajectories may be substantially simultaneously generated (e.g., within technical tolerances) in accordance with a receding horizon technique, wherein one of the multiple trajectories is selected for the vehicle 402 to navigate.

In some examples, the planning component 424 may include a prediction component to generate predicted trajectories of objects in an environment. For example, a prediction component may generate one or more predicted trajectories for objects within a threshold distance from the vehicle 402. In some examples, a prediction component may measure a trace of an object and generate a trajectory for the object based on observed and predicted behavior. In various examples, the trajectory and/or intent of an object may be determined utilizing techniques described in U.S. Pat. No. 10,414,395 and/or U.S. patent application Ser. Nos. 16/151,607, 16/504,147 and/or 15/807,521, incorporated by reference above.

In at least one example, the vehicle computing device(s) 404 may include one or more system controllers 426, which may be configured to control steering, propulsion, braking, safety, emitters, communication, and other systems of the vehicle 402. The system controller(s) 426 may communicate with and/or control corresponding systems of the drive system(s) 414 and/or other components of the vehicle 402.

As illustrated in FIG. 4, the vehicle computing device(s) 404 may include a warning signal component 428. The warning signal component 428 may include the signal emission component 430. In various examples, the signal emission component 430 may be configured to determine when to emit a warning signal, such as warning signals 202 and 304. In some examples, the signal emission component 430 may determine to emit a warning signal based on a location associated with the vehicle 402. In such examples, the signal emission component 430 may receive location data from the localization component 420 and may determine, based on the location data, to emit the warning signal. In various examples, the location may include an area associated with a school zone, an urban area, a business district, a construction zone, and/or other area in which pedestrians, scooters, bicyclists, and the like commonly travel.

In various examples, the signal emission component 430 may determine to emit a warning signal based on a speed associated with the vehicle 402. In some examples, the signal emission component 430 may receive an indication of vehicle speed and/or an indication that the vehicle speed is above or below a threshold speed (e.g., 15 miles per hour, 30 kilometers per hour, etc.), such as from the perception component 422, and may cause the warning signal to be emitted. In various examples, the warning signal may include an electric vehicle warning sound, such as that required by law or regulation to alert objects in the environment of the electric (quiet) vehicle. In such examples, the signal emission component 430 may receive an indication that a speed of the vehicle 402 is at or below the threshold speed and may cause the warning signal to be emitted based on the indication.

In various examples, the signal emission component 430 may determine to emit a warning signal based on a detection of an object in an environment and/or a determination of relevance of that object to the vehicle. In various examples, the object may be determined to be relevant to the vehicle based on a distance between the object and the vehicle being less than a threshold distance. In some examples, the object may be relevant based on a determination that a predicted object trajectory of the object intersects with a vehicle trajectory associated with the vehicle 402. In such examples, the object may be relevant based on a determination that a conflict (e.g., collision) may exist between the vehicle 402 and the object.

The signal emission component 430 may be configured to determine a set of characteristics associated with the warning signal. In various examples, the set of characteristics may be pre-determined (e.g., pre-determined frequency, volume, luminosity, color, motion, shape, etc.), such as based on the location, speed of the vehicle 402, or the like.

In such examples, the signal emission component 430 may emit the pre-determined warning signal. For example, the warning signal may include an electric vehicle warning sound emitted based on a determination that the speed of the vehicle 402 is less than 23 miles per hour. The signal emission component 430 may cause the warning signal with the pre-determined frequency and volume designated for the electric vehicle warning sound to be emitted via one or more emitters 408.

In various examples, the signal emission component 430 may dynamically determine the set of characteristics associated with the warning signal, such as based on real-time conditions. The real-time conditions may include one or more environmental factors (e.g., noise level in the environment 100, amount of traffic, proximity to the object 106, etc.), weather conditions (e.g., rain, snow, hail, wind, etc.), vehicular considerations (e.g., speed, passengers in the vehicle 104, etc.), data associated with the object 106 (e.g., object attribute (e.g., classification, position (e.g., facing/moving toward the vehicle, facing/moving away from the vehicle, etc.), distance from the vehicle, trajectory, etc.), object activity (e.g., walking, running, riding a scooter, (e.g., a particular activity implied by an object trajectory, such as based on speed, etc.), reading a book, talking on a phone, viewing data on an electronic device, interacting with another vehicle, interacting with another object (e.g., talking to another person, looking into a stroller, etc.), eating, drinking, operating a sensory impairment device (e.g., cane, hearing aid, etc.), listening to headphones, etc.), and the like. In such examples, the signal emission component 430 may receive data associated with the environment, such as from the localization component 420 and/or the perception component 422, and may dynamically determine the set of characteristics associated with the warning signal.

In various examples, the signal emission component 430 may be configured to determine that one or more of the environmental factors includes an unknown environmental factor. The unknown environmental factor may include a condition in the environment that the signal emission component 430 is not trained to understand, such as a number of pedestrians in proximity to the vehicle exceeds a threshold number, a noise level in the environment is above a threshold noise level, or the like. For example, the signal emission component 430 may determine that the vehicle is surrounded by a large crowd of pedestrians. In various examples, the signal emission component 430 may determine the set of characteristics based on the unknown environmental factor. In such examples, the set of characteristics may include an event-specific set of characteristics based on the unknown environmental factor. In various examples, the signal emission component 430 may cause data associated with the unknown environmental factor, set of characteristics associated with the warning signal, and object reactions to the warning signal to be stored in the reaction database. In such examples, the data may be utilized to train the system to optimize for an expected (desired) reaction for the unknown environmental factor.

In various examples, the signal emission component 430 may be configured to determine a direction in which the warning signal is to be emitted. In some examples, the signal emission component 430 may cause the warning signal to be emitted around the vehicle, such as in all directions around the vehicle. In some examples, the signal emission component 430 may cause the warning signal to be emitted in a direction associated with objects in an environment. For example, the warning signal may be emitted via speakers on a right side of the vehicle, directed to pedestrians on a sidewalk adjacent a roadway and/or cyclists in a bicycle lane. In various examples, the signal emission component 430 may cause the warning signal to be emitted toward a particular object, such as a relevant object. In such example, the warning signal may cause the warning signal to be emitted via an emitter 408 directed toward the particular object. In some examples, an audio warning signal may be directed toward the particular object utilizing beam steering and/or beamformed array techniques.

In various examples, the reaction determination component 432 of the warning signal component 428 may be configured to determine an object reaction to the warning signal. The object reaction may include a change in an object trajectory (e.g., speed increase, speed decrease, direction of travel away from the vehicle, etc.), a movement of the head and/or shoulders of the object, a gesture (e.g., a wave, etc.), a foot placement of the object, a positional adjustment to an item the object holds (e.g., adjusting a position of an electronic device, book, magazine, or other item), and/or any other movement indicative of an object reacting the first warning signal. In various examples, the reaction determination component 432 may receive sensor data from the perception component 422 and may determine the object reaction based on the sensor data. In other examples, the reaction determination component 432 may receive an indication of the object reaction, such as from the perception component 422. In such examples, the perception component 422 may process the sensor data to determine the object reaction.

In various examples, the reaction determination component 432 may compare the detected object reaction to an expected reaction. In various examples, the reaction determination component 432 may access a reaction database 436 (and/or reaction database 456 on computing device(s) 442) to determine the expected reaction. In such examples, the expected reaction may be stored based on the data associated with the object and/or the set of characteristics associated with the warning signal.

In various examples, the reaction determination component 432 may receive the expected reaction from a machine learning component 434 or machine learning component 454 of the computing device(s) 442. In such examples, the machine learning component 434 and/or 454 may be configured to receive data associated with the object and/or the set of characteristics associated with the warning signal and output an expected reaction. The machine learning components 434 and/or 454 may include one or more models trained utilizing training data comprising a plurality of object reactions to a plurality of warning signals.

In various examples, the machine learning components 434 and/or 454 may be trained to determine an optimal signal for alerting an object of the presence of the vehicle. The optimal signal may be based on one or more real-time considerations present in the environment, such as environmental factors, weather conditions, object activity, and the like (as described above). The optimal signal may include a signal that has the greatest probability of being successful in alerting a particular object to the presence and/or operation of the vehicle.

In some examples, the machine learning components 434 and/or 454 may be trained utilizing training data including previously emitted warning signals, object reactions thereto, and/or associated real-time considerations associated therewith. In such examples, the machine learning components 434 and/or 454 may be configured to receive input comprising real-time considerations and may output an optimal warning signal (e.g., characteristics associated with an optimal warning signal) and/or an expected reaction thereto. In various examples, the training data may include the previously emitted signals and associated reactions and/or real-time considerations that were successful in causing objects to move away from and/or out of the way of the vehicle 402. In such examples, the optimal signal output by the machine learning components 434 and/or 454 to alert a particular object may include a signal that resulted in another object with similar attributes to the particular object reacting according to an expected reaction (e.g., staying out of the vehicle path, moving out of the vehicle path, acknowledging the presence of the vehicle 402, etc.).

Based on the comparison between the object reaction and the expected reaction, the reaction determination component 432 may be configured to determine whether the object reaction substantially matches the expected reaction. In some examples, the object reaction may substantially match the expected reaction based on a determination that the object reaction and the expected reaction share a threshold number of actions (e.g., features). The threshold number of actions may be one or more actions. In some examples, the threshold number of actions may be dynamically determined based on the scenario (e.g., urgency, classification of object, vehicle speed, etc.). For example, an urgent warning signal to an intersecting relevant object may include a threshold number of three matching actions to determine that the object reaction substantially matches the expected reaction whereas a non-urgent warning signal directed toward stationary objects located on a sidewalk may include one matching action to determine a substantial match.

In some examples, the object reaction may substantially match the expected reaction based on a determination that a threshold percentage of actions match between the object reaction and the expected reaction. Continuing the example from above, an urgent warning signal to an intersecting relevant object may include a 90%, match whereas a non-urgent warning signal may include a 50% match.

Responsive to a determination that the object reaction substantially matches the expected reaction, the reaction determination component 432 may determine that the object has been alerted to the vehicle 402 presence and/or operation. In various examples, based on the determination of a substantial match, the reaction determination component 432 may cause data associated with the warning signal and the object reaction to be stored in the reaction database 436 and/or the reaction database 456. In some examples, based on a determination of a substantial match, the reaction determination component 432 may provide data associated with the object reaction and the warning signal to the machine learning components 434 and/or 454, such as to train the machine learning components 434 and/or 454 to output relevant expected reactions.

Responsive to a determination that the object reaction does not substantially match the expected reaction, the reaction determination component 432 may modify the set of characteristics associated with the warning signal. In various examples, the reaction determination component 432 may cause a second (modified) warning signal to be emitted. The second (modified) warning signal may include a second set of characteristics. The second (modified) warning signal may include a signal of a same or a different modality as the first warning signal. In some examples, the reaction determination component 432 may modify one or more of a frequency, volume, luminosity, color, motion, and/or shape of the warning signal to generate the second (modified) warning signal. The reaction determination component 432 may cause the second (modified) warning signal to be emitted via one or more emitters 408, in an updated attempt to alert the object of the presence and/or operation of the vehicle 402.

In various examples, the reaction determination component 432 may continue to modify the sets of characteristics associated with warning signals until the object reaction substantially matches the expected reaction. In some examples, the reaction determination component 432 may modify the sets of characteristics based on a determination of relevance of the object to the vehicle 402. In such examples, the reaction determination component 432 may be configured to determine object relevance, such as utilizing the techniques described above. In various examples, the reaction determination component 432 may determine whether an object is relevant prior to generating a modified signal and/or causing the modified signal to be emitted.

In various examples, the reaction determination component 432 may determine that a relevant object is a blocking object. As described above with regard to FIG. 3, the blocking object may be in a location that at least partially blocks a path of the vehicle 402. In some examples, responsive to determining that the relevant object is a blocking object, the reaction determination component 432 may send an indication of the blocking object to the object routing determination component 438. In various examples, the object routing determination component 438 may be configured to determine whether an area on a road is clear into which the blocking object may move out of the way of the vehicle 402.

As discussed above, the area may include a location that is not in the vehicle path, the lane associated with the vehicle, and/or the adjacent lane. In some examples, the area may include a location into which the blocking object may move to no longer block progress of the vehicle 402 and/or other vehicles/objects traveling in a same direction (in a same lane or on a same roadway) as the vehicle 402. In some examples, the area may include a location that the operator of the blocking object may be unable to view, such as based on a viewing path being blocked by another object.

In various examples, the object routing determination component 438 may send an indication of the clear area into which the blocking object may move out of the way of the vehicle to the signal emission component 430. In some examples, the signal emission component 430 may cause a routing signal to be emitted via the emitter(s) 408. The routing signal may include an indication of the clear area into which the blocking object may move, a route thereto, and/or additional information. In various examples, the routing signal may include characteristics (e.g., frequency, volume, luminosity, color, motion, shape, etc.) to indicate to the operator that a path to the area is clear. For example, the routing signal may include a green arrow projected on a surface of the roadway, such as in the lane associated with the clear area. For another example, the routing signal may be projected on the surface of the road to appear as a set of sequenced flashing lights leading to the clear area, such as an approach lighting system.

In some examples, the reaction determination component 432 may be configured to determine whether the operator reaction matches an expected reaction. In such examples, the expected reaction may include the operator of the blocking object following the routing signal (e.g., moving toward the area, moving out of the path of the vehicle). In some examples, based on a determination that the operator reaction substantially matches the expected reaction and/or the object is irrelevant to the vehicle 402, the reaction determination component 432 may send an indication to the signal emission component 430 and/or emitter(s) 408 to stop emitted the routing signal.

As can be understood, the components discussed herein (e.g., the localization component 420, the perception component 422, the planning component 424, the one or more system controllers 426, the warning signal component 428 including the signal emission component 430, the reaction determination component 432, the machine learning component 434, the reaction database 436, and the object routing determination component 438 are described as divided for illustrative purposes. However, the operations performed by the various components may be combined or performed in any other component.

In some instances, aspects of some or all of the components discussed herein may include any models, techniques, and/or machine learning techniques. For example, in some instances, the components in the memory 418 (and the memory 440, discussed below) may be implemented as a neural network. As described herein, an exemplary neural network is a biologically inspired technique which passes input data through a series of connected layers to produce an output. Each layer in a neural network may also comprise another neural network, or may comprise any number of layers (whether convolutional or not). As can be understood in the context of this disclosure, a neural network may utilize machine learning, which may refer to a broad class of such techniques in which an output is generated based on learned parameters.

In some examples, the vehicle computing device(s) 404 may utilize machine learning techniques to determine one or more characteristics (e.g., frequency, volume, luminosity, color, shape, motion, etc.) of warning signals to be emitted from the vehicle 402. In some examples, one or more data models may be trained to determine the characteristics of the warning signals based on one or more conditions in the environment. The condition(s) may include environmental factors (e.g., noise level in the environment, amount of traffic, proximity to the object, etc.), weather conditions (e.g., rain, snow, hail, wind, etc.), data associated with the object (e.g., object attribute (e.g., classification, position (e.g., facing/moving toward the vehicle, facing/moving away from the vehicle, etc.), distance from the vehicle, trajectory, etc.), object activity (e.g., walking, running, riding a scooter, (e.g., a particular activity implied by an object trajectory, such as based on speed, etc.), reading a book, talking on a phone, viewing data on an electronic device, interacting with another vehicle, interacting with another object (e.g., talking to another person, looking into a stroller, etc.), eating, drinking, operating a sensory impairment device (e.g., cane, hearing aid, etc.), listening to headphones, etc.), and the like. In various examples, the data model(s) may be trained to output the characteristics of the warning signal based at least in part on the condition(s) present in the environment.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 406 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 406 may include multiple instances of each of these or other types of sensors. For instance, the lidar sensors may include individual lidar sensors located at the corners, front, back, sides, and/or top of the vehicle 402. As another example, the camera sensors may include multiple cameras disposed at various locations about the exterior and/or interior of the vehicle 402. The sensor system(s) 406 may provide input to the vehicle computing device(s) 404. Additionally or alternatively, the sensor system(s) 406 may send sensor data, via the one or more networks 444, to the one or more computing device(s) 442 at a particular frequency, after a lapse of a predetermined period of time, in near real-time, etc.

The vehicle 402 may also include one or more emitters 408 for emitting light and/or sound, as described above. The emitters 408 in this example include interior audio and visual emitters to communicate with passengers of the vehicle 402. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 408 in this example also include exterior emitters. By way of example and not limitation, the exterior emitters in this example include lights emitted as a warning signal and/or to signal a direction of travel for an object and/or the vehicle 402 and/or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 402 may also include communication connection(s) 410 that enable communication between the vehicle 402 and one or more other local or remote computing device(s) 442. For instance, the communication connection(s) 410 may facilitate communication with other local computing device(s) on the vehicle 402 and/or the drive system(s) 414. Also, the communication connection(s) 410 may allow the vehicle to communicate with other nearby computing device(s) (e.g., computing device(s) 442, other nearby vehicles, etc.) and/or one or more remote sensor system(s) 446 for receiving sensor data.

The communications connection(s) 410 may include physical and/or logical interfaces for connecting the vehicle computing device(s) 404 to another computing device or a network, such as network(s) 444. For example, the communications connection(s) 410 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 402 may include one or more drive systems 414. In some examples, the vehicle 402 may have a single drive system 414. In at least one example, if the vehicle 402 has multiple drive system 414, individual drive systems 414 may be positioned on opposite ends of the vehicle 402 (e.g., the front and the rear, etc.). In at least one example, the drive system(s) 414 may include one or more sensor systems to detect conditions of the drive system(s) 414 and/or the surroundings of the vehicle 402. By way of example and not limitation, the sensor system(s) may include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders may be unique to the drive system(s) 414. In some cases, the sensor system(s) on the drive system(s) 414 may overlap or supplement corresponding systems of the vehicle 402 (e.g., sensor system(s) 406).

The drive system(s) 414 may include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage j unction, a high voltage cable, charging system, charge port, etc.). Additionally, the drive system(s) 414 may include a drive system controller which may receive and preprocess data from the sensor system(s) 406 and to control operation of the various vehicle systems. In some examples, the drive system controller may include one or more processors and memory communicatively coupled with the one or more processors. The memory 418 may store one or more modules to perform various functionalities of the drive system(s) 414. Furthermore, the drive system(s) 414 may also include one or more communication connection(s) that enable communication by the respective drive system with one or more other local or remote computing device(s) 442.

In at least one example, the direct connection 412 may provide a physical interface to couple the one or more drive system(s) 414 with the body of the vehicle 402. For example, the direct connection 412 may allow the transfer of energy, fluids, air, data, etc. between the drive system(s) 414 and the vehicle. In some instances, the direct connection 412 may further releasably secure the drive system(s) 414 to the body of the vehicle 402.

In at least one example, the localization component 420, the perception component 422, the planning component 424, the one or more system controllers 426, and the warning signal component 428 and various components thereof, may process sensor data, as described above, and may send their respective outputs, over the one or more network(s) 444, to the computing device(s) 442. In at least one example, the localization component 420, the perception component 422, the planning component 424, the one or more system controllers 426, and the warning signal component 428 may send their respective outputs to the computing device(s) 442 at a particular frequency, after a lapse of a predetermined period of time, in near real-time, etc.

In some examples, the vehicle 402 may send sensor data to the computing device(s) 442 via the network(s) 444. In some examples, the vehicle 402 may receive sensor data from the computing device(s) 442 and/or one or more remote sensor systems 446 via the network(s) 444. The sensor data may include raw sensor data and/or processed sensor data and/or representations of sensor data. In some examples, the sensor data (raw or processed) may be sent and/or received as one or more log files.

The computing device(s) 442 may include processor(s) 448 and a memory 440 storing a map component 450, a sensor data processing component 452, a machine learning component 454, and a reaction database 456 (as described above). In some examples, the map component 450 may include functionality to generate maps of various resolutions. In such examples, the map component 450 may send one or more maps to the vehicle computing device(s) 404 for navigational purposes. In various examples, the sensor data processing component 452 may be configured to receive data from one or more remote sensors, such as sensor systems 406 and/or remote sensor system(s) 446. In some examples, the sensor data processing component 452 may be configured to process the data and send processed sensor data to the vehicle computing device(s) 404, such as for use by the warning signal component 428. In some examples, the sensor data processing component 452 may be configured to send raw sensor data to the vehicle computing device(s) 404.

The processor(s) 416 of the vehicle 402 and the processor(s) 448 of the computing device(s) 442 may be any suitable processor capable of executing instructions to process data and perform operations as described herein. By way of example and not limitation, the processor(s) 416 and 448 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 418 and 440 are examples of non-transitory computer-readable media. The memory 418 and 440 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 418 and 440 may include at least a working memory and a storage memory. For example, the working memory may be a high-speed memory of limited capacity (e.g., cache memory) that is used for storing data to be operated on by the processor(s) 416 and 448. In some instances, the memory 418 and 440 may include a storage memory that may be a lower-speed memory of relatively large capacity that is used for long-term storage of data. In some cases, the processor(s) 416 and 448 cannot operate directly on data that is stored in the storage memory, and data may need to be loaded into a working memory for performing operations based on the data, as discussed herein.

It should be noted that while FIG. 4 is illustrated as a distributed system, in alternative examples, components of the vehicle 402 may be associated with the computing device(s) 442 and/or components of the computing device(s) 442 may be associated with the vehicle 402. That is, the vehicle 402 may perform one or more of the functions associated with the computing device(s) 442, and vice versa.

Figure 5:
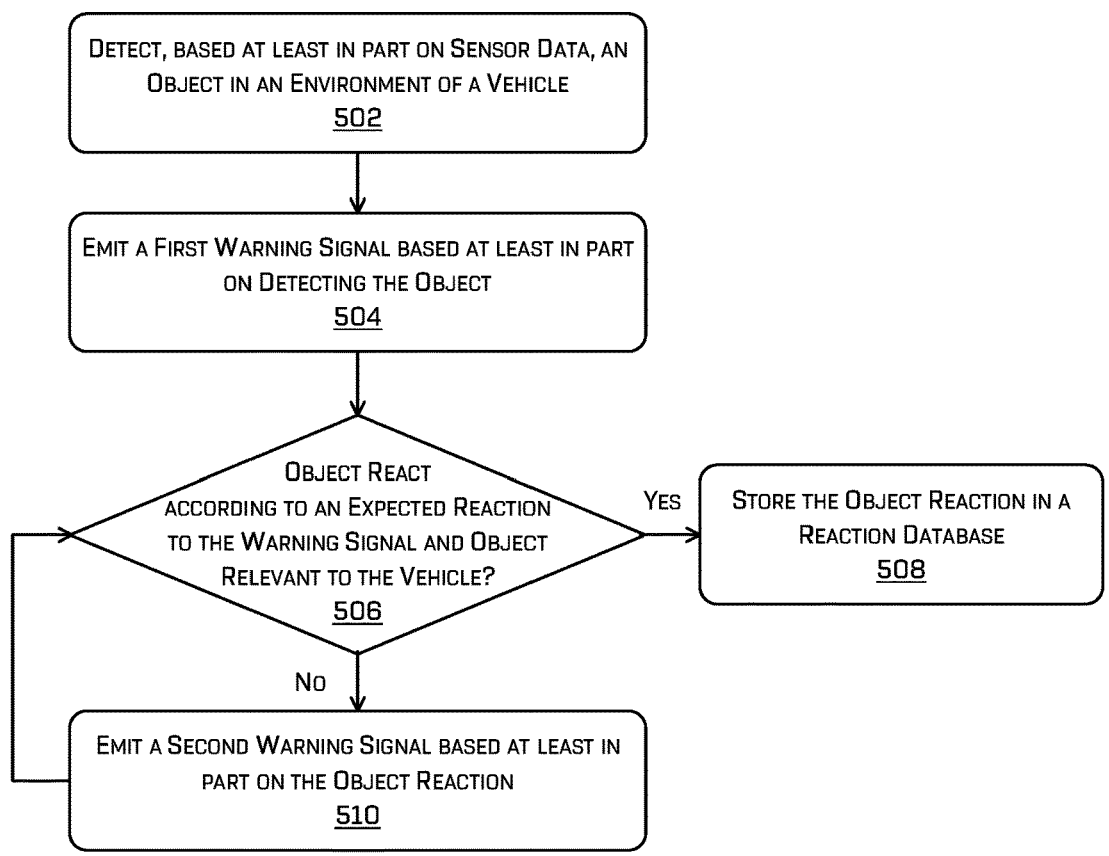
FIG. 5 depicts an example process for emitting different signals to warn an object of a potential conflict between a vehicle and the object.
Figure 6:
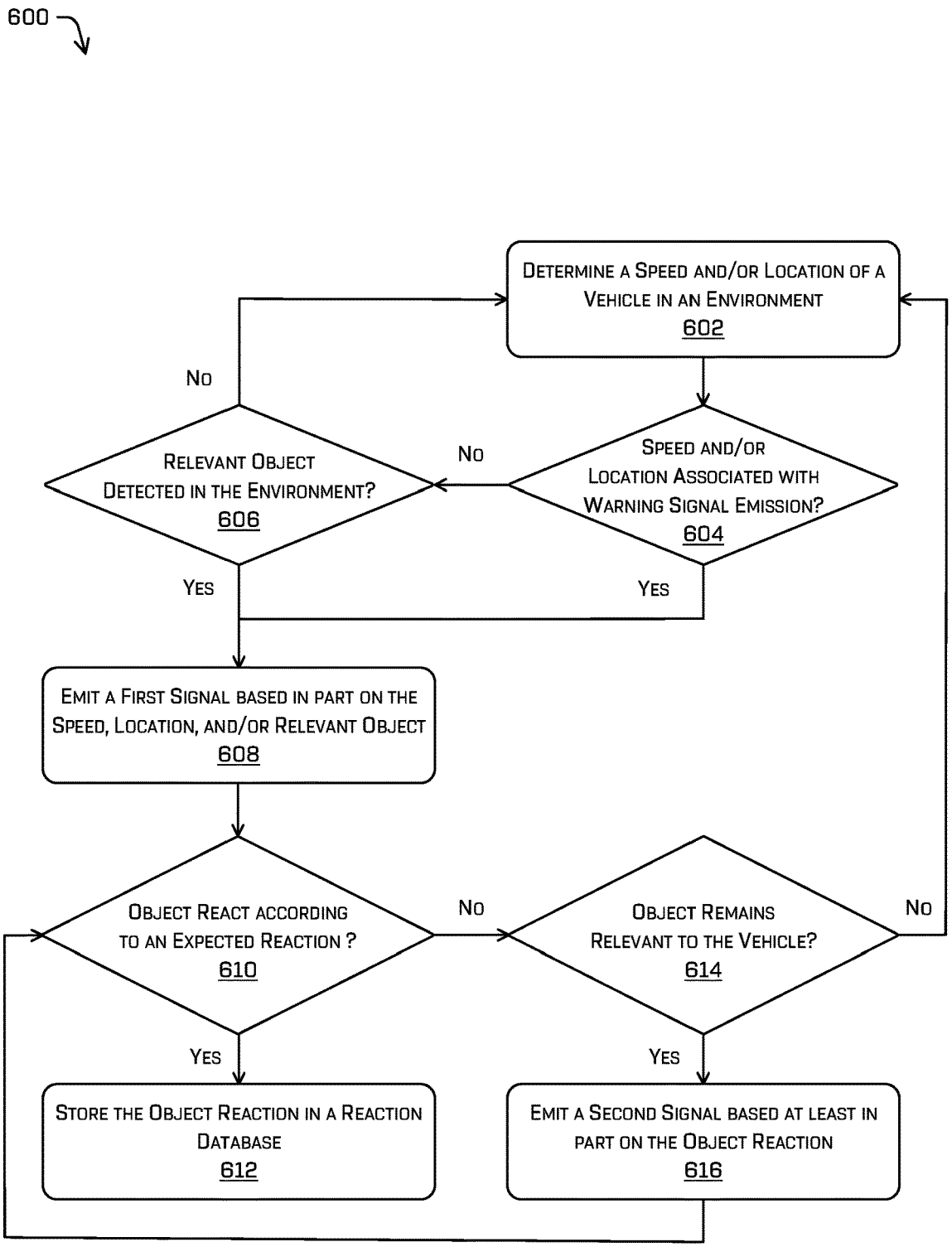
FIG. 6 depicts another example process for emitting warning signals based at least in part on a location of a vehicle and detection of an object that is relevant to the vehicle.
Figure 7:
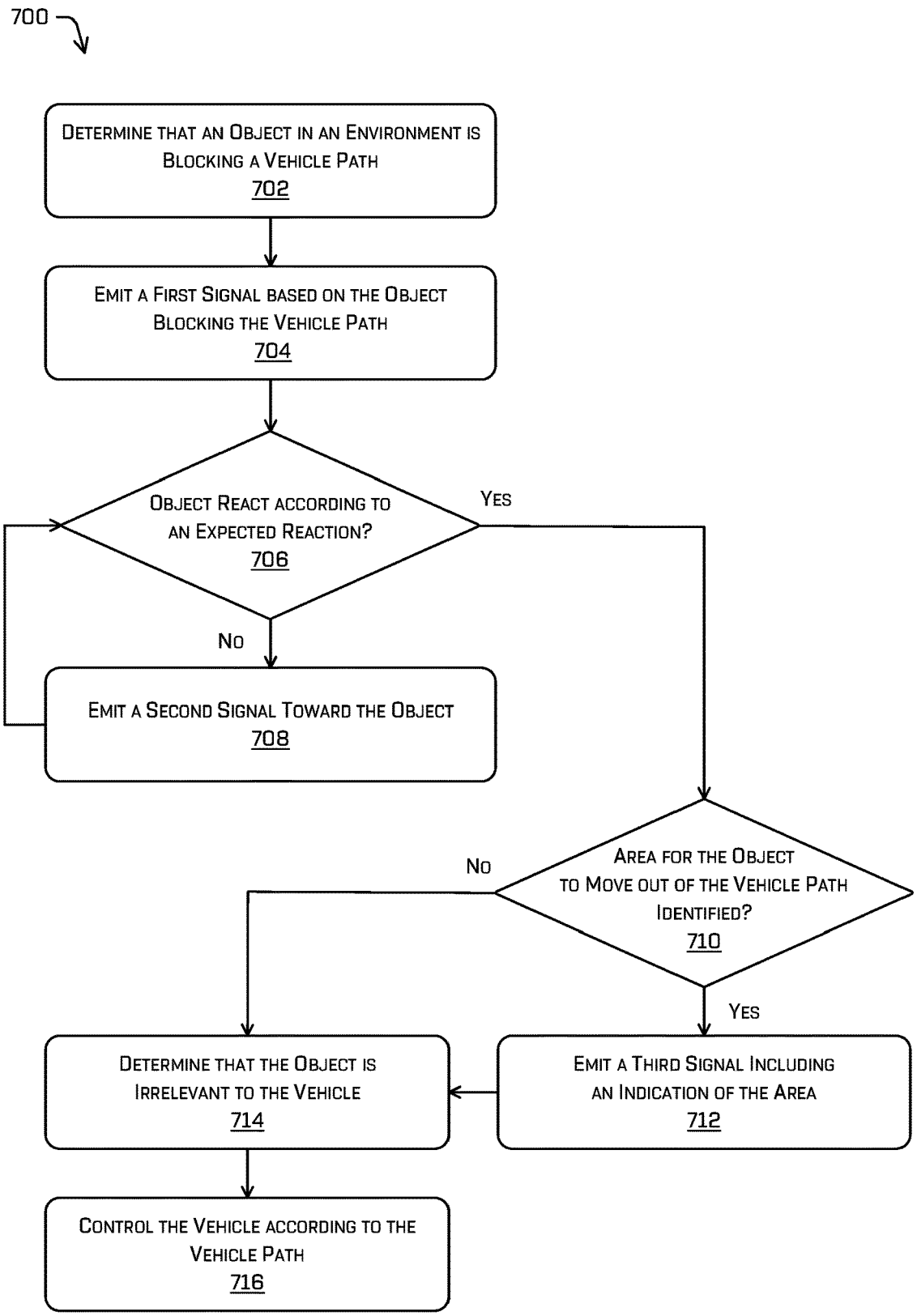
FIG. 7 depicts an example process for emitting at least one of a warning signal or a routing signal based on a determination that an object is blocking a path of a vehicle.

FIGS. 5-7 illustrate example processes in accordance with embodiments of the disclosure. These processes are illustrated as logical flow graphs, each operation of which represents a sequence of operations that may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes.

FIG. 5 depicts an example process 500 for depicts an example process for emitting different signals to warn an object of a potential conflict between a vehicle and the object. For example, some or all of the process 500 may be performed by one or more components in FIG. 4, as described herein. For example, some or all of the process 500 may be performed by the vehicle computing device(s) 404.

At operation 502, the process may include detecting, based at least in part on sensor data, an object in an environment of a vehicle. The sensor data may include data received from one or more sensors of the vehicle and/or one or more remote sensors, such as sensors mounted in the environment or mounted on other vehicles. In various examples, a vehicle computing system of the vehicle may be configured to determine a classification (e.g., type) associated with the object.

At operation 504, the process may include emitting a first warning signal based at least in part on detecting the object. In various examples, the first warning signal may be emitted based on a determination of relevance of the object. In such examples, the vehicle computing system may be configured to determine whether an object is relevant to the vehicle. In various examples, an object relevance may be determined utilizing the techniques described in U.S. patent application Ser. Nos. 16/389,720, 16/417,260, and 16/530,515," incorporated herein by reference above.

In some examples, object relevance may be determined based on a distance between the object and a drivable surface on which the vehicle operates (e.g., a roadway, lane in which the vehicle operates, etc.). In such examples, the object may be determined to be relevant based on the distance being equal to or less than a threshold distance (e.g., 23 inches, 5 feet, 5 meters, etc.). In various examples, the threshold distance may be determined based on the classification associated with the object and/or an object activity. For example, a first threshold distance associated with a walking pedestrian may be 2 meter and a second threshold distance associated with a running pedestrian may be 4 meters.

In various examples, the object may be determined to be relevant based on an object trajectory associated therewith. In such examples, the vehicle computing system may be configured to determine a predicted object trajectory (e.g., object trajectory), such as based on the sensor data. As discussed above, the object trajectory may be determined according to the techniques described in U.S. patent application Ser. Nos. 16/151,607, 16/504,147, and 15/807,521, incorporated herein by reference above.

In various examples, the object may be determined to be relevant to the vehicle based on an intersection between the object trajectory and a vehicle trajectory. In some examples, the object may be relevant based on predicted locations of the object and the vehicle on the respective trajectories. In some examples, the object may be relevant to the vehicle based on a determination that a predicted future object location associated with the object traveling on the object trajectory is within a threshold distance (e.g., 3 feet, 9 feet, 1.5 meters, 3.3 meters, etc.) of a predicted future vehicle location associated with the vehicle traveling on the vehicle trajectory.

In various examples, the first warning signal may include an audio signal and/or a visual signal. The first warning signal may include a first set of characteristics, such as frequency, volume, luminosity, color, shape, motion, or the like. In some examples, the first set of characteristics may include a pre-determined set of characteristics. In such examples, the first warning signal may include a baseline warning signal associated with alerting objects of the presence and/or operation of the vehicle. In various examples, the first set of characteristics may be determined dynamically, such as based on one or more real-time conditions associated with the environment. The real-time conditions may include data associated with the object (e.g., object attribute (e.g., classification, position (e.g., facing/moving toward the vehicle, facing/moving away from the vehicle, etc.), distance from the vehicle, trajectory, etc.), object activity (e.g., walking, running, riding a scooter, (e.g., a particular activity implied by an object trajectory, such as based on speed, etc.), reading a book, talking on a phone, viewing data on an electronic device, interacting with another vehicle, interacting with another object (e.g., talking to another person, looking into a stroller, etc.), eating, drinking, operating a sensory impairment device (e.g., cane, hearing aid, etc.), listening to headphones, etc.), environmental factors (e.g., noise level in the environment, amount of traffic, road conditions, etc.), weather conditions (e.g., rain, snow, hail, wind, etc.), vehicular considerations (e.g., speed, passengers in the vehicle, etc.), and the like.

In various examples, the first warning signal may be emitted in a direction associated with the object. For example, the vehicle computing system may cause the first warning signal to be emitted via emitters substantially facing the object. In some examples, the first warning signal may be directed at the object, such as in a beamformed array.

At operation 506, the process may include determining whether the object reacts according to an expected reaction to the (first) warning signal and that the object remains relevant to the vehicle. In various examples, the vehicle computing system may verify the relevance of the object to the vehicle prior to or concurrently with determining whether the object reacts according to the expected reaction.

In various examples, the vehicle computing system may be configured to determine an object reaction to the first warning signal, based on the sensor data. In some examples, the reaction may include a change in the object trajectory (e.g., speed increase, speed decrease, direction of travel away from the vehicle, etc.), a movement of the head and/or shoulders of the object, a gesture (e.g., a wave, etc.), a foot placement of the object, a positional adjustment to an item the object holds (e.g., adjusting a position of an electronic device, book, magazine, or other item), and/or any other movement indicative of an object reacting the first warning signal.

In various examples, the vehicle computing system may compare the object reaction to an expected reaction associated with the first warning signal. In various examples, the vehicle computing system may be configured to determine the expected reaction based on one or more characteristics of the first warning signal (e.g., volume, frequency, luminosity, color, shape, motion, etc.) and/or data associated with the object (e.g., object attribute (e.g., classification, position (e.g., facing/moving toward the vehicle, facing/moving away from the vehicle, etc.), distance from the vehicle, trajectory, etc.), object activity (e.g., walking, running, riding a scooter, (e.g., a particular activity implied by an object trajectory, such as based on speed, etc.), reading a book, talking on a phone, viewing data on an electronic device, interacting with another vehicle, interacting with another object (e.g., talking to another person, looking into a stroller, etc.), eating, drinking, operating a sensory impairment device (e.g., cane, hearing aid, etc.), listening to headphones, etc.). In some examples, the vehicle computing system may access a database of expected reactions to determine the expected reaction associated with the first warning signal. In such examples, the expected reactions in the database may be stored based at least in part on the data associated with the object and/or characteristic(s) of the first warning signal. In various examples, the vehicle computing system may determine an expected reaction utilizing machine learning techniques. In such examples, a model may be trained utilizing training data including a plurality of warning signals and detected reactions thereto.

Based on the comparison between the object reaction and the expected reaction, the vehicle computing system may determine whether the object reacts according to the expected reaction (e.g., whether a substantial match exists between the object reaction and the expected reaction).

Based on a determination that the object reacts according to the expected reaction (e.g., "Yes" at 506), the process, at operation 508 may include storing the object reaction in a reaction database. In some examples, the reaction database may be used for future object reaction comparisons, such as to increase a confidence in a reaction to the first warning signal, to train the machine learned model, or the like. In various examples, the data associated with the first warning signal, the object reaction and/or the real-time considerations associated with the environment may be used to train a machine learned model for selecting an optimal signal for notifying (e.g., alerting) an object.

Based on a determination that the object does not react according to the expected reaction (e.g., "No" at 506), the process, at operation 510, may include emitting a second warning signal based at least in part on the object reaction. In some examples, the second signal may include a modification to the first warning signal. In such examples, the second signal may include a signal with a different frequency, volume, luminosity, color, shape, motion, and the like, as compared to the first warning signal.

In some examples, the vehicle computing system may determine a second set of characteristics based on a predetermined modification to the frequency, volume, luminosity, color, shape, motion, and the like. For example, subsequent warning signals may include increasing volumes, such that a first warning signal may include an audio signal emitted at 50 decibels, the second warning signal at 60 decibels, and so on. In various examples, the vehicle computing system may determine a second set of characteristics based on one or more real-time conditions. As discussed above, the real-time conditions may include environmental factors, weather conditions, vehicular considerations, data associated with the object, and the like.

In various examples, the second warning signal may be emitted in a direction associated with the object. For example, the vehicle computing system may cause the second warning signal to be emitted via emitters substantially facing the object. In some examples, the second warning signal may be directed at the object, such as in a beamformed array.

In various examples, the vehicle computing system may store data associated with the first warning signal, the object reaction, and/or real-time considerations based on a determination that the object does not react according to an expected reaction ("No" at operation 510). In some examples, the data may be utilized to compare the relative effectiveness of different warning signals, such as to determine an optimized signal for a given scenario.

After emitting the second warning signal, the process may include again determining whether the object reacts according to an expected reaction to the warning signal and that the object remains relevant to the vehicle, such as that illustrated at operation 506. In various examples, the vehicle computing system may continuously modify (e.g., iteratively modify) the warning signal until the vehicle computing system determines that the object reacts according to the expected reaction or determines that the object is irrelevant to the vehicle. In some examples, the vehicle computing system may modify the warning signal a pre-determined number of times and/or until the set of characteristics associated with a warning signal includes a maximum volume, frequency, and/or luminosity. In some examples, the vehicle computing system may cause the last modified warning signal to be emitted until the object is no longer relevant to the vehicle. In some examples, the vehicle computing system may cause the last modified warning signal to be emitted for a pre-determined amount of time (e.g., 30 seconds, 2 minutes, etc.).

FIG. 6 depicts an example process 600 for emitting warning signals based at least in part on a location of a vehicle and detection of an object that is relevant to the vehicle. For example, some or all of the process 600 may be performed by one or more components in FIG. 4, as described herein. For example, some or all of the process 600 may be performed by the vehicle computing device(s) 404.

At operation 602, the process may include determining a speed and/or location of the vehicle in an environment. In various examples, a vehicle computing system may determine the speed and/or the location of the vehicle based on data provided by one or more sensors of the vehicle.

At operation 604, the process may include determining whether the speed and/or location is associated with warning signal emission. In various examples, a speed of the vehicle may be associated with the warning signal emission. In such examples, based on the speed of the vehicle being below a threshold speed, the vehicle computing system may cause the vehicle to emit a warning signal.

In various examples, a location of the vehicle may be associated with the warning signal emission. In some examples, the location may be associated with a classification of object (e.g., pedestrians, bicyclists, etc.). In various examples, the location may be associated with a school zone, proximity to a playground, downtown area, business district, construction zone, popular cycling route, or the like.

In various examples, the location may be associated with the classification of objects, zones, etc. based on a time of day, day of the week, date (e.g., holiday, season, etc.). In such examples, the vehicle computing system may determine a time of day, day of the week, date, etc. and determine whether the location is associated with warning signal emission. For example, the vehicle computing system may operate in a school zone associated with pedestrians. Based on a determination that the day and/or date is associated with a school day, the vehicle computing system may determine that the location is associated with warning signal emission.

Based on a determination that the location is not associated with speed and/or location associated with warning signal emission ("No" at operation 604), at operation 606, the process may include determining whether a relevant object is detected in the environment.

As discussed above, the object may be detected based on sensor data received from one or more sensors of the vehicle and/or one or more remote sensors. In various examples, the vehicle computing system may determine whether the object is relevant to the vehicle. As discussed above, a determination of relevance may be based on a distance between the object and the vehicle, a distance between the object and a vehicle path (e.g., drivable surface, lane, etc. associated with the vehicle path), one or more object trajectories, a vehicle trajectory, and the like.

Based on a determination that a relevant object is not detected in the area ("No" at operation 606), the process may include determining the speed and/or location of the vehicle in the environment, such as that described with regard to operation 602.

Based on a determination that the speed and/or location of the vehicle is associated with warning signal emission ("Yes" at operation 604) or that a relevant object is detected in the environment ("Yes" at operation 606), the process may include, at operation 608, emitting a first signal (e.g., first warning signal) based in part on the speed, location, and/or relevant object. The first signal may include an audio and/or a visual warning signal. The first signal may include a first set of characteristics (e.g., frequency, volume, luminosity, color, shape, motion, etc.). The first set of characteristics may include one or more pre-determined characteristics and/or one or more dynamically determined characteristics. The pre-determined characteristic(s) may be based on the speed, location, and/or relevant object (e.g., classification, proximity, etc.). The dynamically determined characteristic(s) may be based on one or more real-time conditions in the environment (e.g., data associated with the object, environmental factors, weather conditions, vehicular considerations, etc.).

In various examples, the first signal may be emitted in a direction associated with the object. For example, the vehicle computing system may cause the first signal to be emitted via emitters substantially facing the object. In some examples, the first signal may be directed at the object, such as in a beamformed array.

At operation 610, the process may include determining whether an object reacts (to the first signal) according to an expected reaction. In various examples, the vehicle computing system may determine an object reaction, such as based on sensor data. The object reaction may include a change (or lack thereof) in an object trajectory (e.g., speed increase, speed decrease, direction of travel away from the vehicle, etc.), a movement of the head and/or shoulders of the object, a gesture (e.g., a wave, etc.), a foot placement of the object, a positional adjustment to an item the object holds (e.g., adjusting a position of an electronic device, book, magazine, or other item), and/or any other movement indicative of an object reacting the first signal.

The vehicle computing system may compare the object reaction to the expected reaction to determine whether the object reacts according to the expected reaction. In some examples, the computing system may access a database of expected reactions to determine the expected reaction. In various examples, the expected reaction may be stored in the database based on data associated with the object, characteristic(s) of the first signal, or the like. In some examples, the vehicle computing system may determine the expected reaction utilizing machine learning techniques. In such examples, the vehicle computing system may input the data associated with the object and/or characteristic(s) of the first signal into a machine learned model trained to determine expected reactions of object and may receive an output of an expected reaction.

As discussed above, the object may react according to the expected reaction based on a substantial match between the (observed, detected) object reaction and the expected reaction. The vehicle computing system may determine a substantial match based on a number of actions (e.g., features) and/or a percentage of actions between the object reaction and the expected reaction matching.

Based on a determination that the object reacts according to an expected reaction ("Yes" at operation 610), the process, at operation 612, may include storing the object reaction in a reaction database, such as database 122. In some examples, the database may be used for future object reaction comparisons, such as to increase a confidence in an object reaction to the first signal, to train the machine learned model, or the like.

Based on a determination that the object does not react according to the expected reaction ("No" at operation 610), the process, at operation 614, may include determining whether the object remains relevant to the vehicle. The determination of continued relevance may be based on relevance determination techniques described above, such as in the description of operation 606.

In various examples, the vehicle computing system may store data associated with the first signal, the object reaction, and/or real-time considerations based on a determination that the object does not react according to an expected reaction ("No" at operation 610). In some examples, the data may be utilized to compare the relative effectiveness of different warning signals, such as to determine an optimized signal for a given scenario.

Based on a determination that the object is irrelevant to the vehicle ("No" at operation 614), the process may include, at operation 602, determining the speed and/or location of the vehicle in the environment.

Based on a determination that the object is relevant to the vehicle ("Yes" at operation 614), the process may include, at operation 616, emitting a second signal based at least in part on the object reaction. The second signal may include an audio and/or visual signal emitted to alert the object of the vehicle presence and/or operation. The second signal may include a same or a different modality(ies) as the first signal. The second signal may include a second set of characteristics. In various examples, the second set of characteristics may include one or more characteristics that are different from the first set of characteristics. In some examples, the vehicle computing system may modify the first set of characteristics to generate the second signal (e.g., second set of characteristics).

In various examples, the second signal may be emitted in a direction associated with the object. For example, the vehicle computing system may cause the second signal to be emitted via emitters substantially facing the object. In some examples, the second signal may be directed at the object, such as in a beamformed array.

Based at least in part on emitting the second signal, the process may include, at operation 610, determining whether the object reacts (to the second signal) according to an expected reaction. In various examples, the vehicle computing system may continue to modify the emitted signals until the object becomes irrelevant to the vehicle or the object reacts according to the expected reaction. In some examples, the vehicle computing system may modify the signal a pre-determined number of times (e.g., 7 times, 10 times, etc.). In such examples, the vehicle computing system may cease modifying the emitted signals. In some examples, the vehicle computing system may modify the signal for a pre-determined period of time. In such examples, the vehicle computing system may cease modifying the signals after the period of time has expired.

FIG. 7 depicts an example process 700 for emitting at least one of a warning signal or a routing signal based on a determination that an object is blocking a path of a vehicle. For example, some or all of the process 700 may be performed by one or more components in FIG. 4, as described herein. For example, some or all of the process 700 may be performed by the vehicle computing device(s) 404.

At operation 702, the process may include determining that an object in an environment is blocking the vehicle path. A vehicle computing system may determine that the object is a blocking object based on sensor data received from one or more sensors of a vehicle and/or remote sensor(s) in the environment. In various examples, the vehicle path may include a drivable area of a roadway associated with a route from a current location of the vehicle to a destination. In some examples, the drivable area may include the width of the vehicle and/or a buffer distance on either side of the vehicle (e.g., 12 centimeters, 6 inches, 1 foot, etc.).

In various examples, the vehicle computing system may determine the object is blocking the vehicle path based on a determination that an object location associated with the object is at least partially within the vehicle path. In various examples, the vehicle computing system may determine that the object is blocking the vehicle path based on a determination that the vehicle is not able to proceed around the object in a lane associated with the vehicle path.

At operation 704, the process may include emitting a first signal based on the object blocking the vehicle path. The first signal may include an audio and/or a visual warning signal. The first signal may include a first set of characteristics (e.g., frequency, volume, luminosity, color, shape, motion, etc.). The first set of characteristics may include one or more pre-determined characteristics and/or one or more dynamically determined characteristics. The pre-determined characteristic(s) may be based on the speed, location, and/or relevant object (e.g., classification, proximity, etc.). The dynamically determined characteristic(s) may be based on one or more real-time conditions in the environment (e.g., data associated with the object, environmental factors, weather conditions, vehicular considerations, etc.).

In various examples, the first signal may be emitted in a direction associated with the object. For example, the vehicle computing system may cause the first signal to be emitted via emitters substantially facing the object. In some examples, the first signal may be directed at the object, such as in a beamformed array.

At operation 706, the process may include determining whether the object reacts (to the first signal) according to an expected reaction. In various examples, the vehicle computing system may determine an object reaction, such as based on sensor data. The object reaction may include a change (or lack thereof) in an object trajectory (e.g., speed increase, speed decrease, direction of travel away from the vehicle, etc.), a movement of the head and/or shoulders of the object, a gesture (e.g., a wave, etc.), a foot placement of the object, a positional adjustment to an item the object holds (e.g., adjusting a position of an electronic device, book, magazine, or other item), and/or any other movement indicative of an object reacting the first signal.

The vehicle computing system may compare the object reaction to the expected reaction to determine whether the object reacts according to the expected reaction. In some examples, the computing system may access a database of expected reactions to determine the expected reaction. In various examples, the expected reaction may be stored in the database based on data associated with the object, characteristic(s) of the first signal, or the like. In some examples, the vehicle computing system may determine the expected reaction utilizing machine learning techniques. In such examples, the vehicle computing system may input the data associated with the object and/or characteristic(s) of the first signal into a machine learned model trained to determine expected reactions of object and may receive an output of an expected reaction.

As discussed above, the object may react according to the expected reaction based on a substantial match between the (observed, detected) object reaction and the expected reaction. The vehicle computing system may determine a substantial match based on a number of actions (e.g., features) and/or a percentage of actions between the object reaction and the expected reaction matching.

Based on a determination that the object does not react according to the expected reaction ("No" at operation 706), the process, at operation 708, may include emitting a second signal toward the object. The second signal may include an audio and/or a visual warning signal. The second signal may include a second set of characteristics (e.g., frequency, volume, luminosity, color, shape, motion, etc.). The second set of characteristics may include one or more pre-determined characteristics and/or one or more dynamically determined characteristics. The pre-determined characteristic(s) may be based on the speed, location, and/or relevant object (e.g., classification, proximity, etc.). The dynamically determined characteristic(s) may be based on one or more real-time conditions in the environment (e.g., data associated with the object, environmental factors, weather conditions, vehicular considerations, etc.).

In various examples, the second signal may be emitted in the direction associated with the object. For example, the vehicle computing system may cause the second signal to be emitted via emitters facing the object. In some examples, the second signal may be directed at the object, such as in a beamformed array.

Based on a determination that the object reacts according to an expected reaction ("Yes" at operation 706), the process, at operation 710, may include determining whether an area for the object to move out of the vehicle path is identified. In some examples, the area may include a location that is not in the vehicle path, a lane associated with the vehicle, and/or an adjacent lane. In such examples, the area may include a location to which the blocking object may move to no longer block progress of the vehicle and/or other vehicles/objects traveling in the lane and/or the adjacent lane. In some examples, the area may include a size large enough for the object to move and no longer block progress of the vehicle and/or other vehicles/objects. In some examples, the area may include a location that the operator of the object may be unable to view, such as based on a viewing path being blocked by another object.

Based on a determination that the area for the object to move out of the vehicle path exists ("Yes" at operation 710), the process, at operation 712, may include emitting a third signal including an indication of the area. In some examples, the third signal may include an indication of an object path (route) out of the vehicle path. In some examples, the third signal may indicate to the operator of the object that the area exists and is clear. In various examples, the third signal may include a symbol or other indicator, such as an arrow, to indicate to the operator of the object a location associated with the area. In various examples, the symbol or other indicator may be projected on a drivable surface proximate the object and/or the area. In some examples, the symbol or other indicator may include a holographic image projected in view of the operator of the object.

At operation 714, the process may include determining that the object is irrelevant to the vehicle. Additionally, the vehicle computing system may determine that the object is irrelevant based on a determination that the area for the object of move out of the path does not exist ("No" at operation 710). In various examples, a determination that the object is irrelevant to the vehicle may be based on a determination that the object is no longer blocking the vehicle path. In such examples, the vehicle computing system may determine that the object has moved into or toward the area (e.g., according to the third signal) and/or another area out of the vehicle path.

At operation 716, the process may include controlling the vehicle according to the vehicle path. In various examples, the vehicle control according to the vehicle path may be based on traffic rules, laws, etc. For example, the vehicle computing system may determine that, by the time the object is no longer blocking the vehicle path, that a traffic light has turned red. Based on the determination that the traffic light is red, the vehicle may maintain a position and wait for the traffic light to turn green.

EXAMPLE CLAUSES

A: A vehicle comprising: a sensor; an emitter; one or more processors; and one or more computer-readable media storing instructions that, when executed, configure the vehicle to: determine, based at least in part on sensor data from the sensor, an object in an environment associated with the vehicle; determine, based at least in part on the sensor data, an object trajectory associated with the object; determine, based at least in part on the object trajectory, that the object is relevant to a progress of the vehicle; emit, via the emitter, a first signal based at least in part on determining that the object is relevant to the progress of the vehicle, the first signal comprising a first characteristic; determine, based at least in part on the sensor data, an object reaction to the first signal; and based at least in part on the object reaction, emit a second signal, wherein the second signal comprises a second characteristic different from the first characteristic.

B: A vehicle as paragraph A describes, wherein emitting the second signal is further based at least in part on determining that the object reaction differs from an expected reaction, wherein the object reaction is a first object reaction and the expected reaction is a first expected reaction, and wherein the instructions further cause the vehicle to: determine a second object reaction to the second signal; and based at least in part on the second object reaction, store data associated with the second object reaction in a database.

C: A vehicle as either one of paragraphs A or B describe, wherein: the first characteristic comprises at least one of: one or more first frequencies; one or more first volumes; one or more first luminosities; one or more first colors; one or more first shapes; or one or more first motions; and the second characteristic comprises at least one of: one or more second frequencies; one or more second volumes; one or more second luminosities; one or more second colors one or more second shapes; or one or more second motions.

D: A vehicle as any one of paragraphs A-C describe, wherein at least one of the first characteristic or the second characteristic is based at least in part on an activity associated with the object, the activity comprising at least one of: listening to headphones; viewing data on a mobile device; reading a book; talking on a mobile phone; eating; drinking; a particular activity implied by a predicted trajectory; operating a sensory impairment device; a head of the object facing a direction away from a location associated with the vehicle; interacting with another vehicle in the environment; or interacting with another object in proximity to the object.

E: A vehicle as any one of paragraphs A-C describe, wherein the instructions further cause the vehicle to determine the expected reaction based at least in part on at least one of: machine learning techniques; or expected reaction data stored in a database, wherein the expected reaction is associated with at least one of: the first characteristic; a classification of the object; a position of the object; or an object activity.

F: A computer-implemented method comprising: detecting, based on sensor data from a sensor on a vehicle, an object in an environment, the object comprising an object attribute; causing, based at least in part on the object attribute, a first signal to be emitted via an emitter of a vehicle at a first time, the first signal comprising a first characteristic; determining, based at least in part on additional sensor data from the sensor, an object reaction of the object at a second time after the first time; and based on the object reaction, causing a second signal to be emitted via the emitter of the vehicle, the second signal comprising a second characteristic.

G: A computer-implemented method as paragraph F describes, wherein the sensor data is first sensor data, the method further comprising: determining that the object is relevant to a progress of the vehicle; and causing at least one of the first signal or the second signal to be emitted in a direction associated with the object based at least in part on determining that the object is relevant to the progress of the vehicle.

H: A computer-implemented method as either one of paragraphs F or G describe, wherein causing the second signal to be emitted is further based on determining that the object continues to impede progress of the vehicle after the second time.

I: A computer-implemented method as any one of paragraphs F-H describe, wherein at least one of the first characteristic or the second characteristic is based at least in part on at least one of: an environmental factor in the environment; a weather condition in the environment; a location of the vehicle in the environment; a speed of the vehicle in the environment; an activity associated with the object; a position of the object relative to the vehicle; a time of day in which the vehicle is operating; a time of year in which the vehicle is operating; or a day in a week in which the vehicle is operating.

J: A computer-implemented method as paragraph I describes, wherein the activity comprises one or more of: listening to headphones; viewing data on a mobile device; reading a book; talking on a mobile phone; eating; drinking; a particular activity implied by a predicted trajectory; operating a sensory impairment device; a head of the object facing a direction away from a location associated with the vehicle; interacting with another vehicle in the environment; or interacting with another object in proximity to the object.

K: A computer-implemented method as any one of paragraphs F-I describe, wherein causing the second signal to be emitted is further based at least in part on determining that the object reaction differs from an expected reaction and wherein the object reaction is a first object reaction and the expected reaction is a first expected reaction, the method further comprising: determining a second object reaction of the object to the second signal; and storing data associated with at least one of the second signal or the second object reaction in a database based at least in part on the second object reaction.

L: A computer-implemented method as any one of paragraphs F-K describe, wherein the emitter comprises at least one of: a speaker; a light; or a projector.

M: A computer-implemented method as any one of paragraphs F-L describe, further comprising iteratively emitting additional signals until at least one of: determining that the object is not associated with the vehicle; determining that a timer associated with a warning signal has expired; or determining that a number of warning signals emitted meets or exceeds a threshold number.

N: A computer-implemented method as any one of paragraphs F-M describe, further comprising: determining that the object is at least partially blocking a vehicle path associated with the vehicle; identifying a location for the object to move, the location being outside the vehicle path and clear of other objects; and based at least in part on identifying the location, causing a third signal to be emitted via a second emitter, wherein the third signal provides an indication to the object of the location for the object to move.

O: A system or device comprising: a processor; and a non-transitory computer-readable medium storing instructions that, when executed, cause a processor to perform a computer-implemented method as any one of paragraphs F-M describe.

P: A system or device comprising: a means for processing; and a means for storing coupled to the means for processing, the means for storing including instructions to configure one or more devices to perform a computer-implemented method as any one of paragraphs F-M describe.

Q: One or more non-transitory computer-readable media storing instructions that, when executed, cause a vehicle to perform operations comprising: detecting, based at least in part on sensor data from a sensor, an object in an environment, the object comprising an object attribute; based at least in part on the object attribute, emitting a first signal via an emitter of a vehicle at a first time, the first signal comprising a first characteristic; determining, based at least in part on additional sensor data from the sensor, an object reaction of an object at a second time after the first time; and based on the object reaction emitting a second signal via the emitter of the vehicle, the second signal comprising a second characteristic.

R: One or more non-transitory computer-readable media as paragraph Q describes, the operations further comprising: determining that the object is relevant to the progress of the vehicle; and causing at least one of the first signal or the second signal to be emitted in a direction associated with the object based at least in part on determining that the object is relevant to the progress of the vehicle.

S: One or more non-transitory computer-readable media as either one of paragraphs Q or R describe, the operations further comprising: determining an activity associated with the object; and determining the first characteristic based at least in part on the activity, wherein the activity comprises one or more of: listening to headphones; viewing data on a mobile device; reading a book; talking on a mobile phone; eating; drinking; a particular activity implied by a predicted trajectory; operating a sensory impairment device; a head of the object facing a direction away from a location associated with the vehicle; interacting with another vehicle in the environment; or interacting with another object in proximity to the object.

T: One or more non-transitory computer-readable media as any one of paragraphs Q-S describe, the operations further comprising determining the second characteristic utilizing a machine learned model, the machine learned model trained based at least in part on previously emitted signals which caused additional objects having similar attributes to perform an action to unblock the vehicle.

U: One or more non-transitory computer-readable media as any one of paragraphs Q-T describe, wherein: the object attribute comprises an object trajectory, the object reaction comprises a modification to at least one of a speed or a direction associated with the object trajectory, and emitting the second signal is based at least in part on determining that the modification to the at least one of the speed or the direction is less than a threshold modification associated with an expected reaction.

V: One or more non-transitory computer-readable media as paragraph U describes, the operations further comprising further comprising iteratively emitting additional signals until at least one of: determining that the object is not relevant to a progress of the vehicle; determining that a timer associated with a warning signal has expired; or determining that a number of warning signals emitted meets or exceeds a threshold number.

While the example clauses A-V described above are described with respect to one particular implementation, it should be understood that, in the context of this document, the content of the example clauses A-V may also be implemented via a method, device, system, a computer-readable medium, and/or another implementation.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A vehicle comprising:
   a sensor;
   an emitter;
   one or more processors; and
   one or more computer-readable media storing instructions that, when executed, configure the vehicle to:
      determine, based at least in part on sensor data from the sensor, an object in an environment associated with the vehicle;
      determine, based at least in part on the sensor data, an object trajectory associated with the object;
      determine, based at least in part on the object trajectory, that the object is relevant to a progress of the vehicle;
      emit, via the emitter, a first signal based at least in part on determining that the object is relevant to the progress of the vehicle, the first signal comprising a first characteristic;
      determine, based at least in part on the sensor data, an object reaction to the first signal;
      based at least in part on the object reaction differing from an expected reaction, emit a second signal, wherein the second signal comprises a second characteristic different from the first characteristic; and
      store data associated with the first signal and the object reaction in a database.

2. The vehicle of claim 1, wherein the instructions further cause the vehicle to:
   determine a second object reaction to the second signal; and
   based at least in part on the second object reaction, store data associated with the second object reaction in the database.

3. The vehicle of claim 1, wherein:
   the first characteristic comprises at least one of:
      one or more first frequencies;
      one or more first volumes;
      one or more first luminosities;
      one or more first colors;
      one or more first shapes; or
      one or more first motions; and
   the second characteristic comprises at least one of:
      one or more second frequencies;
      one or more second volumes;
      one or more second luminosities;
      one or more second colors;
      one or more second shapes; or
      one or more second motions.

4. The vehicle of claim 1, wherein at least one of the first characteristic or the second characteristic is based at least in part on an activity associated with the object, the activity comprising at least one of:
   listening to headphones;
   viewing data on a mobile device;
   reading a book;
   talking on a mobile phone;
   eating;
   drinking;
   a particular activity implied by a predicted trajectory;
   operating a sensory impairment device;
   a head of the object facing a direction away from a location associated with the vehicle;
   interacting with another vehicle in the environment; or
   interacting with another object in proximity to the object.

5. The vehicle of claim 1, wherein the instructions further cause the vehicle to determine the expected reaction based at least in part on at least one of:
   machine learning techniques; or
   expected reaction data stored in a database,
   wherein the expected reaction is associated with at least one of:
      the first characteristic;
      a classification of the object;
      a position of the object; or
      an object activity.

6. A method comprising:
   detecting, based on sensor data from a sensor on a vehicle, an object in an environment, the object comprising an object attribute;
   causing, based at least in part on the object attribute, a first signal to be emitted via an emitter of a vehicle at a first time, the first signal comprising a first characteristic;
   determining, based at least in part on additional sensor data from the sensor and at a second time after the first time an object reaction of the object to the first signal;
   based on the object reaction differing from an expected reaction, causing a second signal to be emitted via the emitter of the vehicle, the second signal comprising a second characteristic; and
   storing data associated with the first signal and the object reaction in a database.

7. The method of claim 6, wherein the sensor data is first sensor data, the method further comprising:
   determining that the object is relevant to a progress of the vehicle; and
   causing at least one of the first signal or the second signal to be emitted in a direction associated with the object based at least in part on determining that the object is relevant to the progress of the vehicle.

8. The method of claim 6, wherein causing the second signal to be emitted is further based on determining that the object continues to impede progress of the vehicle after the second time.

9. The method of claim 6, wherein at least one of the first characteristic or the second characteristic is based at least in part on at least one of:
an environmental factor in the environment;
a weather condition in the environment;
a location of the vehicle in the environment;
a speed of the vehicle in the environment;
an activity associated with the object;
a position of the object relative to the vehicle;
a time of day in which the vehicle is operating;
a time of year in which the vehicle is operating; or
a day in a week in which the vehicle is operating.

10. The method of claim 9, wherein the activity comprises one or more of:
listening to headphones;
viewing data on a mobile device;
reading a book;
talking on a mobile phone;
eating;
drinking;
a particular activity implied by a predicted trajectory;
operating a sensory impairment device;
a head of the object facing a direction away from a location associated with the vehicle;
interacting with another vehicle in the environment; or
interacting with another object in proximity to the object.

11. The method of claim 6, further comprising:
determining a second object reaction of the object to the second signal; and
storing data associated with at least one of the second signal or the second object reaction in the database based at least in part on the second object reaction.

12. The method of claim 6, wherein the emitter comprises at least one of:
a speaker;
a light; or
a projector.

13. The method of claim 6, further comprising iteratively emitting additional signals until at least one of:
determining that the object is not associated with the vehicle;
determining that a timer associated with a warning signal has expired; or
determining that a number of warning signals emitted meets or exceeds a threshold number.

14. The method of claim 6, further comprising:
determining that the object is at least partially blocking a vehicle path associated with the vehicle;
identifying a location for the object to move, the location being outside the vehicle path and clear of other objects; and
based at least in part on identifying the location, causing a third signal to be emitted via a second emitter, wherein the third signal provides an indication to the object of the location for the object to move.

15. One or more non-transitory computer-readable media storing instructions that, when executed, cause a vehicle to perform operations comprising:
detecting, based at least in part on sensor data from a sensor, an object in an environment, the object comprising an object attribute;
based at least in part on the object attribute, emitting a first signal via an emitter of a vehicle at a first time, the first signal comprising a first characteristic;
determining, based at least in part on additional sensor data from the sensor and at a second time after the first time, an object reaction of the object to the first signal;
based at least in part on the object reaction differing from an expected reaction, emitting a second signal via the emitter of the vehicle, the second signal comprising a second characteristic; and
storing data associated with the first signal and the object reaction in a database.

16. The one or more non-transitory computer-readable media of claim 15, the operations further comprising:
determining that the object is relevant to the progress of the vehicle; and
causing at least one of the first signal or the second signal to be emitted in a direction associated with the object based at least in part on determining that the object is relevant to the progress of the vehicle.

17. The one or more non-transitory computer-readable media of claim 15, the operations further comprising:
determining an activity associated with the object; and
determining the first characteristic based at least in part on the activity,
wherein the activity comprises one or more of:
listening to headphones;
viewing data on a mobile device;
reading a book;
talking on a mobile phone;
eating;
drinking;
a particular activity implied by a predicted trajectory;
operating a sensory impairment device;
a head of the object facing a direction away from a location associated with the vehicle;
interacting with another vehicle in the environment; or
interacting with another object in proximity to the object.

18. The one or more non-transitory computer-readable media of claim 15, the operations further comprising determining the second characteristic utilizing a machine learned model, the machine learned model trained based at least in part on previously emitted signals which caused additional objects having similar attributes to perform an action to unblock the vehicle.

19. The one or more non-transitory computer-readable media of claim 15, wherein:
the object attribute comprises the object trajectory,
the modification comprises a change to at least one of a speed or a direction associated with the object trajectory, and
emitting the second signal is based at least in part on determining that the change to the at least one of the speed or the direction is less than a threshold change associated with an expected reaction.

20. The one or more non-transitory computer-readable media of claim 19, the operations further comprising further comprising iteratively emitting additional signals until at least one of:
determining that the object is not relevant to a progress of the vehicle;
determining that a timer associated with a warning signal has expired; or
determining that a number of warning signals emitted meets or exceeds a threshold number.

* * * * *